United States Patent
Wang et al.

(10) Patent No.: US 11,297,576 B2
(45) Date of Patent: Apr. 5, 2022

(54) INNOVATIVE SIGNALING APPROACHES TO NETWORK FOR OVERHEATING INDICATION IN NEW RADIO (NR) AND MULTI-RADIO DUAL CONNECTIVITY (MR-DC)

(71) Applicant: QUALCOMM Incorporated, San Diego, CA (US)

(72) Inventors: Shanshan Wang, San Diego, CA (US); Arvind Vardarajan Santhanam, San Diego, CA (US); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/990,850

(22) Filed: Aug. 11, 2020

(65) Prior Publication Data
US 2021/0051592 A1 Feb. 18, 2021

Related U.S. Application Data

(60) Provisional application No. 62/885,750, filed on Aug. 12, 2019.

(51) Int. Cl.
*H04W 52/02* (2009.01)
*H04W 76/15* (2018.01)
*H04W 84/04* (2009.01)

(52) U.S. Cl.
CPC ... *H04W 52/0261* (2013.01); *H04W 52/0206* (2013.01); *H04W 76/15* (2018.02); *H04W 84/042* (2013.01)

(58) Field of Classification Search
CPC .............. H04W 52/0261; H04W 76/15; H04W 52/0206; H04W 84/042
(Continued)

(56) References Cited

U.S. PATENT DOCUMENTS

2019/0182881 A1* 6/2019 Teyeb ................... H04W 16/32
2020/0351638 A1* 11/2020 Kim ...................... H04W 8/005

FOREIGN PATENT DOCUMENTS

EP         3565298 A1    11/2019
WO   WO-2018130115 A1    7/2018

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", 3GPP Draft, 36300-F60, 3rd Generation Partnership Project (3GPP), Mobile Competence Centre, 650, Route Des Lucioles, F-06921, Sophia-Antipolis Cedex, France, Jun. 29, 2019 (Jun. 29, 2019), XP051744771, 449 pages, Retrieved from the Internet: URL: http://www.3gpp.org/ftp/3guInternal/3GPP%5Fultimate%5Fversions%5Fto%5Fbe%5Ftransposed/sentToDpc/36300%2Df60%2Ezip [retrieved on Jun. 29, 2019] Section 16.3.

(Continued)

*Primary Examiner* — Gbemileke J Onamuti
(74) *Attorney, Agent, or Firm* — Norton Rose Fulbright US LLP

(57) ABSTRACT

One or more aspects of overheating signaling are disclosed. In some implementations, a method of wireless communication includes transmitting, by a user equipment (UE) while in a dual connectivity configuration, an overheat assistance indicator corresponding to an overheating condition at the UE. The method also includes, after sending the overheat assistance indicator and based on the overheating condition, performing, by the UE, an adjustment on a new radio (NR) configuration.

30 Claims, 9 Drawing Sheets

(58) Field of Classification Search
USPC .......................................................... 370/318
See application file for complete search history.

(56) References Cited

OTHER PUBLICATIONS

"3rd Generation Partnership Project; Technical Specification Group Radio Access Network; NR; Radio Resource Control (RRC) protocol specification (Release 15)," 3GPP Draft, 38331-F60, 3rd Generation Partnership Project (3GPP), Mobile Competence Centre, 650, Route Des Lucioles, F-06921, Sophia-Antipolis Cedex, France, Jun. 29, 2019 (Jun. 29, 2019), XP051744789, pp. 1-519, Retrieved from the Internet: URL: http://www.3gpp.org/ftp/3guInternal/3GPP%5Fultimate%5Fversions%5Fto%5Fbe%5Ftransposed/sentToDpc/38331%2Df60%2Ezip [retrieved on Jun. 29, 2019] Section 5.7.4.3.

Huawei, et al., "Further Consideration on Overheating Issue in EN-DC Scenario," 3GPP Draft, 3GPP TSG-RAN2 Meeting#106, R2-1907865, Further Considerations on Overheating Issue in EN-DC Scenario, 3rd Generation Partnership Project (3GPP), Mobile Competence Centre, 650, Route Des Lucioles, F-06921, Sophia-Antipolis Cedex, France, vol. RAN WG2, No. Reno, USA; May 13, 2019-May 17, 2019, May 3, 2019 (May 3, 2019), XP051712135, 4 pages, Retrieved from the Internet: URL: http://www.3gpp.org/ftp/tsg%5Fran/WG2%5FRL2/TSGR2%5F106/Docs/R2%2D1907865%2Ezip [retrieved on 2819-05-83] the whole document.

International Search Report and Written Opinion—PCT/US2020/045904—ISA/EPO—dated Dec. 1, 2020.

\* cited by examiner

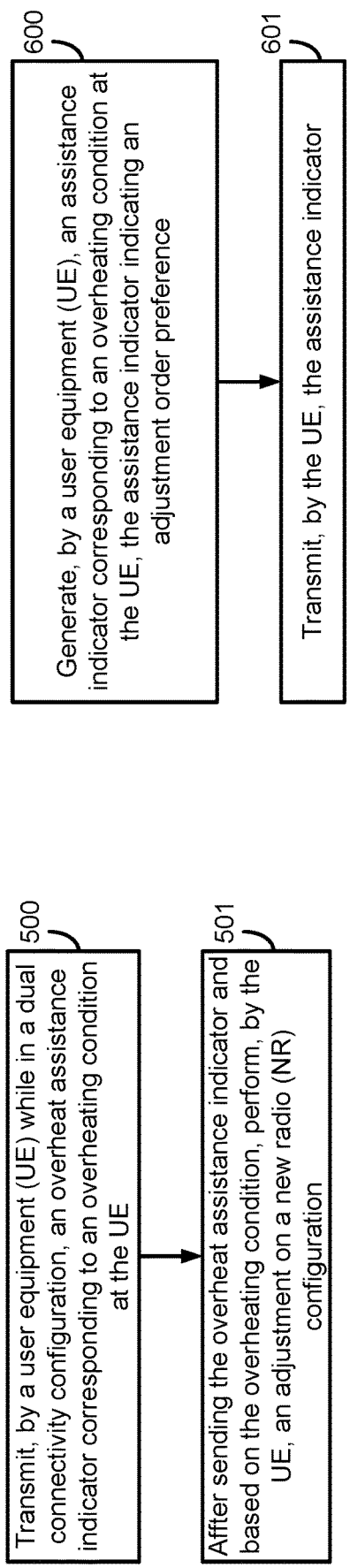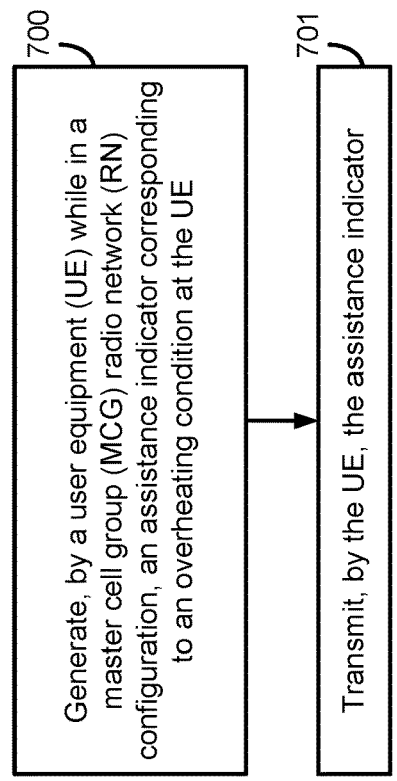
FIG. 5
FIG. 6
FIG. 7

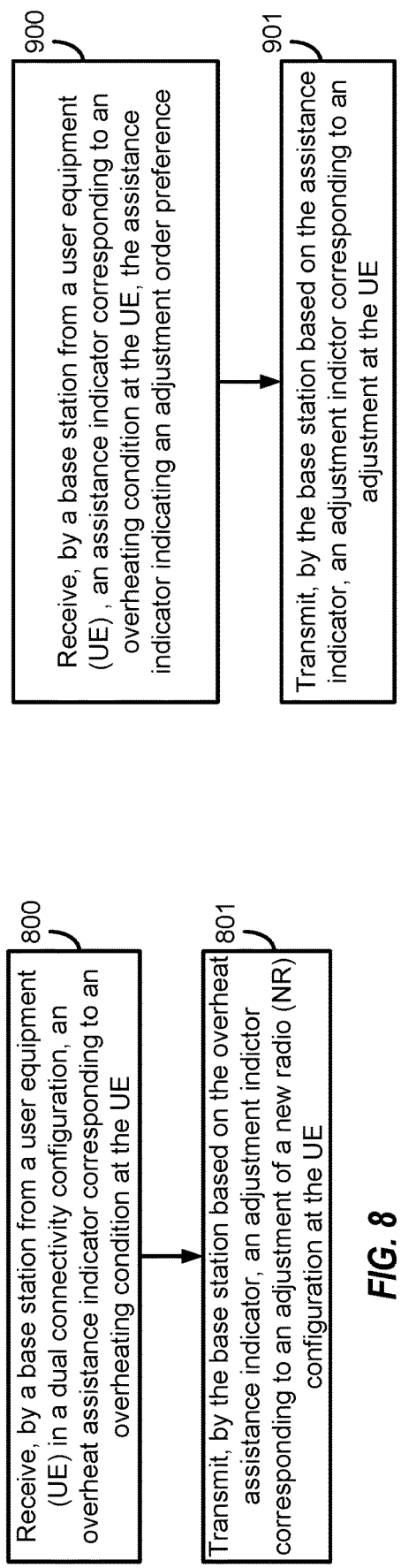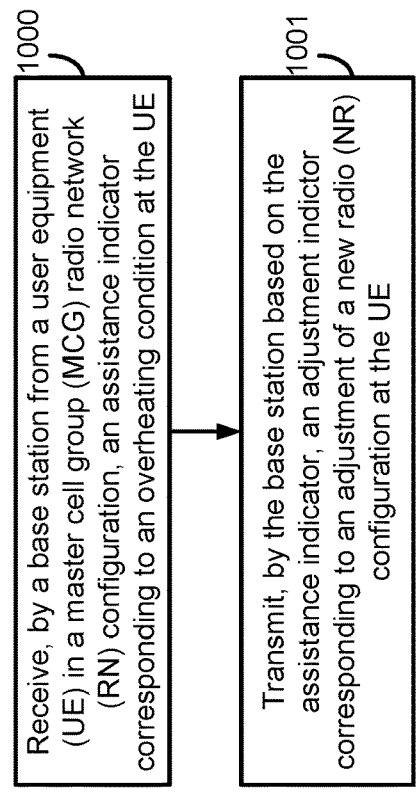
FIG. 8
FIG. 9
FIG. 10

INNOVATIVE SIGNALING APPROACHES TO NETWORK FOR OVERHEATING INDICATION IN NEW RADIO (NR) AND MULTI-RADIO DUAL CONNECTIVITY (MR-DC)

CROSS-REFERENCE TO RELATED APPLICATIONS

This application claims priority to U.S. Provisional Application No. 62/885,750, entitled "INNOVATIVE SIGNALING APPROACHES TO NETWORK FOR OVERHEATING INDICATION IN NR AND MR-DC," filed Aug. 12, 2019, the disclosure of which is hereby incorporated herein by reference.

TECHNICAL FIELD

Aspects of the present disclosure relate generally to wireless communication systems, and more particularly, to overheating signaling.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

With the introduction of $5^{th}$ Generation (5G) or new radio (NR) networks (sometimes referred to as "5G NR" networks/systems/devices), UEs are able to have higher capability, higher data rate, higher bandwidth. Additionally, UEs are also able to operate in a variety of architectures that provide dual connectivity. As devices continue to improve and "do more", overheating becomes a concern for continued operation of a device and for a positive user experience. For example, when a device overheats, the overheating can damage one or more components and negatively impact the user experience.

Solutions that address overheating while still providing communication services have been proposed and implemented for long term evolution (LTE) and for NR in a standalone mode in which a UE interacts with the network to implement a corrective action to reduce an overheating condition at the UE. However, an approach to address overheating at a UE in dual connectivity has yet to be identified.

BRIEF SUMMARY OF SOME EMBODIMENTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication includes transmitting, by a user equipment (UE) while in a dual connectivity configuration, an overheat assistance indicator corresponding to an overheating condition at the UE. The method also includes, after sending the overheat assistance indicator and based on the overheating condition, performing, by the UE, an adjustment on a new radio (NR) configuration.

In an additional aspect of the disclosure, an apparatus configured for wireless communication includes means for transmitting, by a UE while in a dual connectivity configuration, an overheat assistance indicator corresponding to an overheating condition at the UE. The apparatus further includes means for performing, by the UE, an adjustment on an NR configuration after sending the overheat assistance indicator and based on the overheating condition.

In an additional aspect of the disclosure, a non-transitory computer-readable medium having program code recorded thereon is disclosed. The program code further includes code to: transmit, by a UE while in a dual connectivity configuration, an overheat assistance indicator corresponding to an overheating condition at the UE; and perform, by the UE, an adjustment on an NR configuration after sending the overheat assistance indicator and based on the overheating condition.

In an additional aspect of the disclosure, an apparatus configured for wireless communication is disclosed. The apparatus includes at least one processor, and a memory coupled to the processor. The processor is configured to transmit, by a UE while in a dual connectivity configuration, an overheat assistance indicator corresponding to an overheating condition at the UE; and perform, by the UE, an adjustment on an NR configuration after sending the overheat assistance indicator and based on the overheating condition.

In an additional aspect of the disclosure, a method of wireless communication includes generating, by a UE, an assistance indicator corresponding to an overheating condition at the UE, the assistance indicator indicating an adjustment order preference. The method also includes transmitting, by the UE, the assistance indicator.

In an additional aspect of the disclosure, an apparatus configured for wireless communication includes means for generating, by a UE, an assistance indicator corresponding to an overheating condition at the UE, the assistance indicator indicating an adjustment order preference. The apparatus further includes means for transmitting, by the UE, the assistance indicator.

In an additional aspect of the disclosure, a non-transitory computer-readable medium having program code recorded thereon. The program code further includes code to: generate, by a UE, an assistance indicator corresponding to an overheating condition at the UE, the assistance indicator indicating an adjustment order preference; and transmit, by the UE, the assistance indicator.

In an additional aspect of the disclosure, an apparatus configured for wireless communication is disclosed. The apparatus includes at least one processor, and a memory coupled to the processor. The processor is configured to generate, by a UE, an assistance indicator corresponding to an overheating condition at the UE, the assistance indicator indicating an adjustment order preference; and transmit, by the UE, the assistance indicator.

In an additional aspect of the disclosure, a method of wireless communication includes generating, by a UE while in a master cell group (MCG) radio network (RN) configuration, an assistance indicator corresponding to an overheating condition at the UE. The method also includes transmitting, by the UE, the assistance indicator.

In an additional aspect of the disclosure, an apparatus configured for wireless communication includes means for generating, by a UE while in an MCG RN configuration, an assistance indicator corresponding to an overheating condition at the UE. The apparatus further includes means for transmitting, by the UE, the assistance indicator.

In an additional aspect of the disclosure, a non-transitory computer-readable medium having program code recorded thereon. The program code further includes code to: generate, by a UE while in an MCG RN configuration, an assistance indicator corresponding to an overheating condition at the UE; and transmit, by the UE, the assistance indicator.

In an additional aspect of the disclosure, an apparatus configured for wireless communication is disclosed. The apparatus includes at least one processor, and a memory coupled to the processor. The processor is configured to generate, by a UE while in an MCG RN configuration, an assistance indicator corresponding to an overheating condition at the UE; and transmit, by the UE, the assistance indicator.

In an additional aspect of the disclosure, a method of wireless communication includes receiving, by a base station from a UE in a dual connectivity configuration, an overheat assistance indicator corresponding to an overheating condition at the UE. The method also includes transmitting, by the base station based on the overheat assistance indicator, an adjustment indicator corresponding to an adjustment of an NR configuration at the UE.

In an additional aspect of the disclosure, an apparatus configured for wireless communication includes means for receiving, by a base station from a UE in a dual connectivity configuration, an overheat assistance indicator corresponding to an overheating condition at the UE. The apparatus further includes means for transmitting, by the base station based on the overheat assistance indicator, an adjustment indicator corresponding to an adjustment of an NR configuration at the UE.

In an additional aspect of the disclosure, a non-transitory computer-readable medium having program code recorded thereon. The program code further includes code to: receive, by a base station from a UE in a dual connectivity configuration, an overheat assistance indicator corresponding to an overheating condition at the UE; and transmit, by the base station based on the overheat assistance indicator, an adjustment indicator corresponding to an adjustment of an NR configuration at the UE.

In an additional aspect of the disclosure, an apparatus configured for wireless communication is disclosed. The apparatus includes at least one processor, and a memory coupled to the processor. The processor is configured to receive, by a base station from a UE in a dual connectivity configuration, an overheat assistance indicator corresponding to an overheating condition at the UE; and transmit, by the base station based on the overheat assistance indicator, an adjustment indicator corresponding to an adjustment of an NR configuration at the UE.

In an additional aspect of the disclosure, a method of wireless communication includes receiving, by a base station from a UE, an assistance indicator corresponding to an overheating condition at the UE, the assistance indicator indicating an adjustment order preference. The method also includes transmitting, by the base station based on the assistance indicator, an adjustment indicator corresponding to an adjustment.

In an additional aspect of the disclosure, an apparatus configured for wireless communication includes means for receiving, by a base station from a UE, an assistance indicator corresponding to an overheating condition at the UE, the assistance indicator indicating an adjustment order preference. The apparatus further includes means for transmitting, by the base station based on the assistance indicator, an adjustment indicator corresponding to an adjustment.

In an additional aspect of the disclosure, a non-transitory computer-readable medium having program code recorded thereon is disclosed. The program code further includes code to: receive, by a base station from a UE, an assistance indicator corresponding to an overheating condition at the UE, the assistance indicator indicating an adjustment order preference; and transmit, by the base station based on the assistance indicator, an adjustment indicator corresponding to an adjustment.

In an additional aspect of the disclosure, an apparatus configured for wireless communication is disclosed. The apparatus includes at least one processor, and a memory coupled to the processor. The processor is configured to receive, by a base station from a UE, an assistance indicator corresponding to an overheating condition at the UE, the assistance indicator indicating an adjustment order preference; and transmit, by the base station based on the assistance indicator, an adjustment indicator corresponding to an adjustment.

In an additional aspect of the disclosure, a method of wireless communication includes receiving, by a base station from a UE in an MCG RN configuration, an assistance indicator corresponding to an overheating condition at the UE. The method also includes transmitting, by the base station based on the assistance indicator, an adjustment indicator corresponding to an adjustment of an NR configuration at the UE.

In an additional aspect of the disclosure, an apparatus configured for wireless communication includes means for receiving, by a base station from a UE in an MCG RN configuration, an assistance indicator corresponding to an overheating condition at the UE. The apparatus further includes means for transmitting, by the base station based on the assistance indicator, an adjustment indicator corresponding to an adjustment of an NR configuration at the UE.

In an additional aspect of the disclosure, a non-transitory computer-readable medium having program code recorded thereon is disclosed. The program code further includes code to: receive, by a base station from a UE in an MCG RN configuration, an assistance indicator corresponding to an overheating condition at the UE; and transmit, by the base station based on the assistance indicator, an adjustment indicator corresponding to an adjustment of an NR configuration at the UE.

In an additional aspect of the disclosure, an apparatus configured for wireless communication is disclosed. The apparatus includes at least one processor, and a memory coupled to the processor. The processor is configured to receive, by a base station from a UE in an MCG RN configuration, an assistance indicator corresponding to an overheating condition at the UE; and transmit, by the base station based on the assistance indicator, an adjustment indicator corresponding to an adjustment of an NR configuration at the UE.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments the exemplary embodiments can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 5 is a block diagram illustrating example blocks executed by a UE configured according to aspects of the present disclosure.

FIG. 6 is a block diagram illustrating example blocks executed by a UE configured according to an aspect of the present disclosure.

FIG. 7 is a block diagram illustrating example blocks executed by a UE configured according to aspects of the present disclosure.

FIG. 8 is a block diagram illustrating example blocks executed by a base station configured according to aspects of the present disclosure.

FIG. 9 is a block diagram illustrating example blocks executed by a base station configured according to aspects of the present disclosure.

FIG. 10 is a block diagram illustrating example blocks executed by a base station configured according to aspects of the present disclosure.

DETAILED DESCRIPTION

Figure 1:
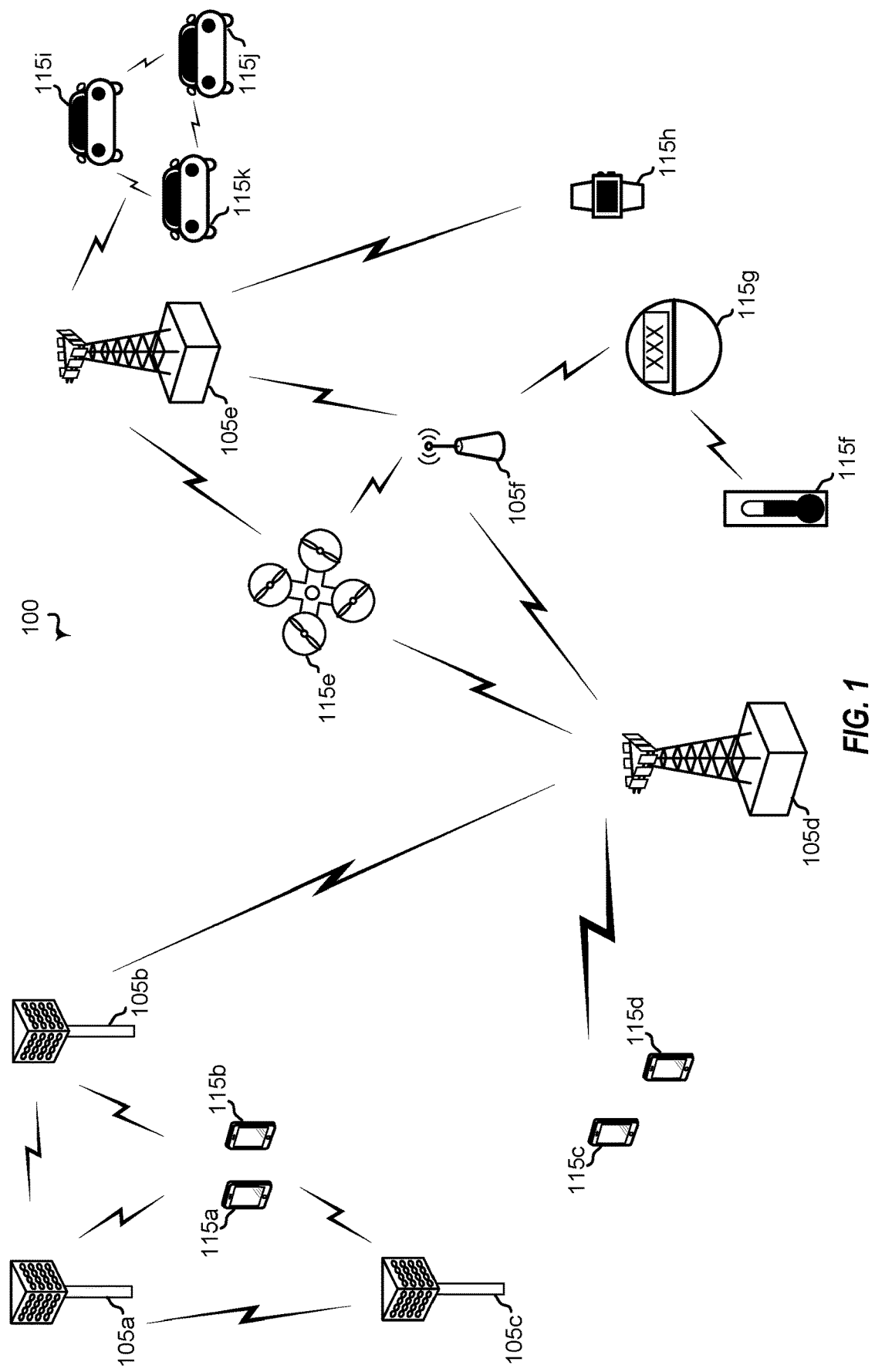
FIG. 1 is a block diagram illustrating details of a wireless communication system according to aspects of the present disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in communication as between two or more wireless devices in one or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as GSM. 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may include one or more GERANs, which may be coupled with Universal Terrestrial Radio Access Networks (UTRANs) in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, nd Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP LTE is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces, such as those of 5G NR.

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 shows wireless network 100 for communication according to some embodiments. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may include a plurality of operator wireless networks), and may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may include embodiments of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the embodiment illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a lightning bolt (e.g., communication link) indicates wireless transmissions between a UE and a serving base station, which is a base station designated to serve the UE on the downlink and/or uplink, or desired transmission between base stations, and backhaul transmissions between base stations. Backhaul communication between base stations of wireless network 100 may occur using wired and/or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of embodiments supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD/FDD communications, such as in a vehicle-to-vehicle (V2V) mesh network between UEs 115i-115k communicating with macro base station 105e.

Figure 2:
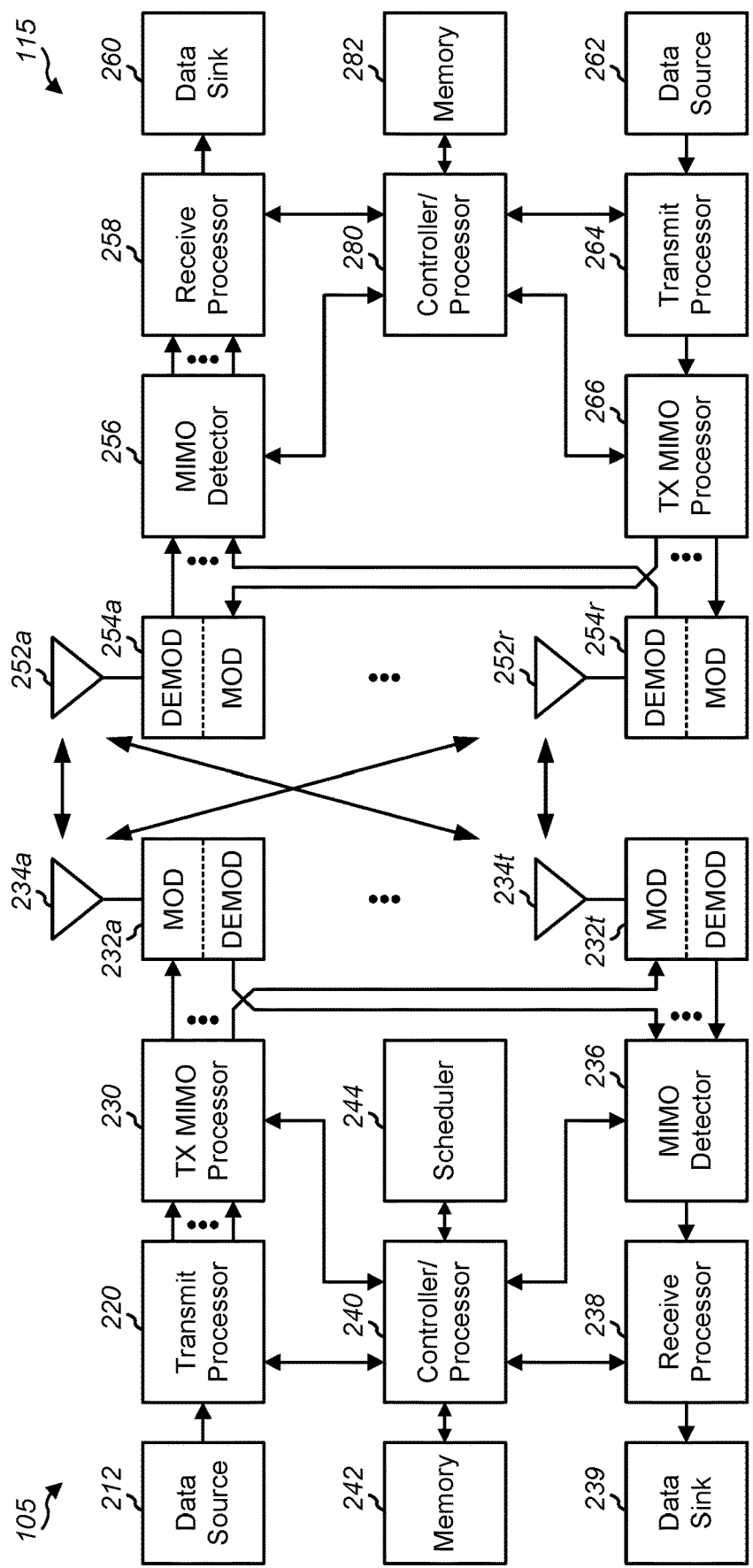
FIG. 2 is a block diagram conceptually illustrating a design of a base station and a UE configured according to aspects of the present disclosure.

FIG. 2 shows a block diagram of a design of a base station 105 and a UE 115, which may be any of the base stations and one of the UEs in FIG. 1. For a restricted association scenario (as mentioned above), base station 105 may be small cell base station 105f in FIG. 1, and UE 115 may be UE 115c or 115D operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At the base station 105, a transmit processor 220 may receive data from a data source 212 and control information from a controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232a through 232t. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the physical uplink shared channel (PUSCH)) from a data source 262 and control information (e.g., for the physical uplink control channel (PUCCH)) from the controller/processor 280. Transmit processor 264 may also generate reference symbols for a reference signal. The symbols from the transmit processor 264 may be precoded by TX MIMO processor 266 if applicable, further processed by the modulators 254a through 254r (e.g., for SC-FDM, etc.), and transmitted to the base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 28 and/or other processors and modules at UE 115 may perform or direct the execution of various processes for the techniques described herein, such as to perform or direct the execution illustrated in FIGS. 5-10, and/or other processes for the techniques described herein. Memories 242 and 282 may store data and program codes for base station 105 and UE 115, respectively. Scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Figure 3:
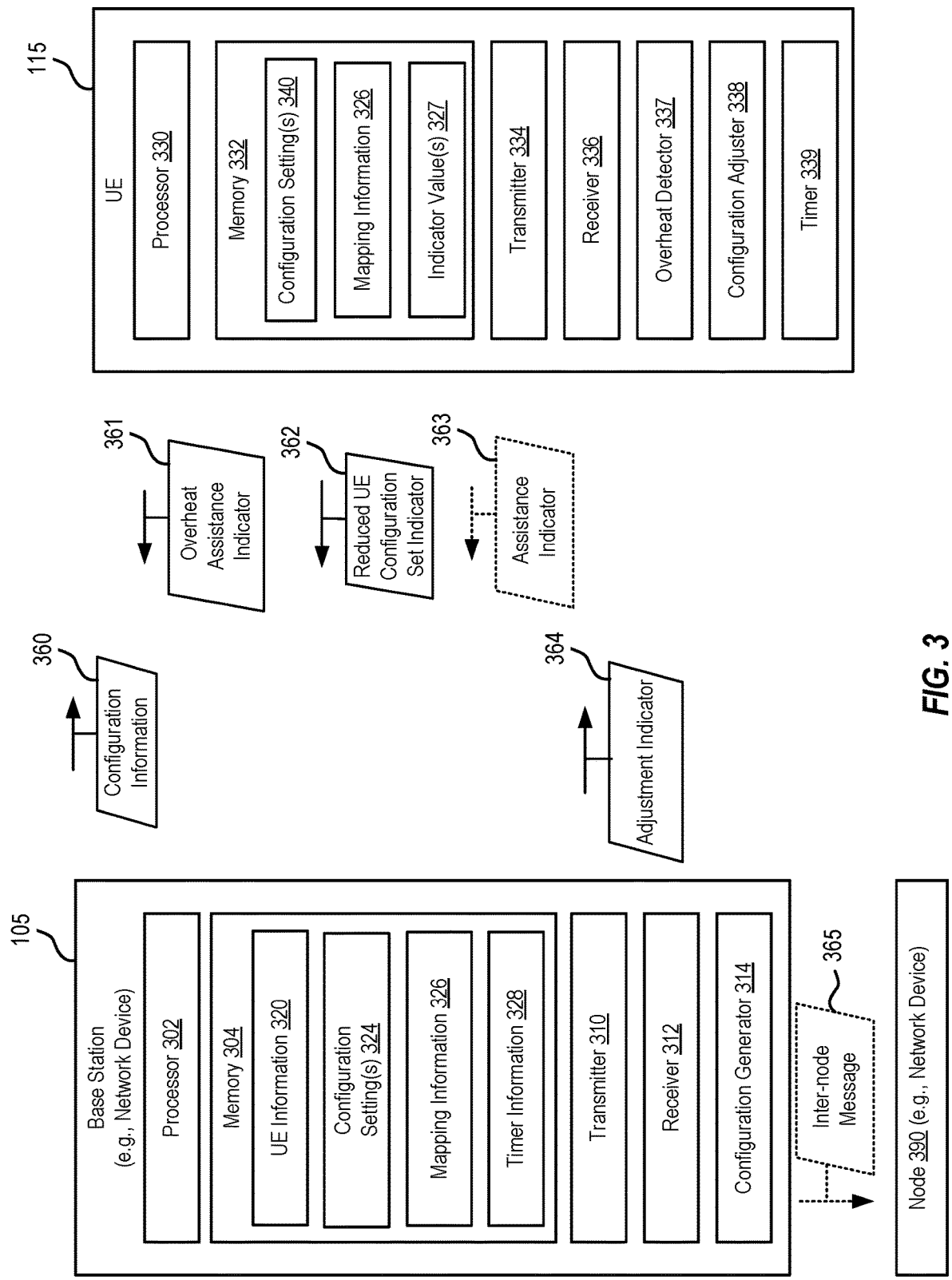
FIG. 3 is a diagram illustrating overheating signaling according to aspects of the present disclosure.

FIG. 3 illustrates an example of a wireless communications system 300 that supports overheating signaling in accordance with aspects of the present disclosure. In some examples, wireless communications system 300 may implement aspects of wireless communication system 100. For example, wireless communications system 300 may include UE 115 and base station 105. Additionally, wireless communication system 300 may include a node 390, such as a network device. For example, node 390 may include another base station. For example, base station 105 (e.g., a network entity or a network device) may include or correspond to a first base station (e.g., a first network entity or a first network device), such as an eNB, and node 390 may include a second base station (e.g., a second network entity or a second network device), such as a gNB. Although base station 105 and node 390 are illustrated as being separate, in other implementations, base station 105 may include node 390. Accordingly, as described herein, node 390 may include one or more components or may be configured to preform one or more operations or functions as described with reference to base station 105.

Base station 105 includes processor 302, memory 304, transmitter 310, receiver 312, and a configuration generator 314. Processor 302 may be configured to execute instructions stores at memory 304 to perform the operations described herein. In some implementations, processor 302 includes or corresponds to controller/processor 240, and memory 304 includes or corresponds to memory 242. Memory 304 may also be configured to store UE information 320, one or more configuration settings 324, mapping information 326, and timer information 328, as further described herein.

For example, the UE information 320 may indicate one or more UEs in communication with base station 105. In some implementations, UE information 320 may include or indicate, for a UE, a configuration of the UE. Configuration settings 324 may include one or more configuration settings for a UE (e.g., UE 115), such as one or more configured SCells, one or more active SCells, PUCCH repetition mode (e.g., scheme), radio resource control (RRC) configuration information (e.g., 324), a connectivity configuration (e.g., dual connectivity or stand alone connectivity), or a combination thereof.

Mapping information 326 information may include one or data structures for mapping one or more UE configurations to different indicator values. In some implementations, mapping information 326 includes one or more mapping tables. For example, mapping information 326 may include a first mapping table for uplink and a second mapping table for downlink. Additionally, or alternatively, mapping information 326 may include different mapping tables for a first frequency range and a second frequency range. To illustrate, the first frequency range may include or correspond to frequency range 1 (FR1) for 5G NR, which includes frequencies from 450 megahertz (MHz) to 6 gigahertz (GH) in sub-6 GHz, and the second frequency range may include or correspond to second frequency range (FR2) for 5G NR, which includes frequencies from 24.25 GHz to 52.6 GHz in mm-Wave.

Transmitter 310 is configured to transmit data to one or more other devices, and receiver 312 is configured to receive data from one or more other devices. For example, transmitter 310 may transmit data, and receiver 312 may receive data, via a network, such as a wired network, a wireless network, or a combination thereof. For example, base station 105 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 310 and receiver 312 may be replaced with a transceiver. Additionally, or alternatively, transmitter 310, receiver, 312, or both may include or correspond to one or more components of base station 105 described with reference to FIG. 2.

Configuration generator 314 is configured to generate the one or more RRC configurations or MAC-CEs. For example, configuration generator 314 may generate one or more RRC configurations or one or more MAC-CEs based on UE information 320, configuration setting 324, mapping information 326, or a combination thereof. To illustrate, configuration generator 314 may generate one or more MAC-CEs to selectively deactivate and activate the one or more NR SCells at UE 115, as described further herein, at least with reference to FIG. 4A. Additionally or alternatively, configuration generator 314 may generate one or more RRC configurations to selectively deconfigure and reconfigure the one or more NR SCells at UE 115, as described further herein, at least with reference to FIG. 4B.

UE 115 includes processor 330, memory 332, transmitter 334, receiver 336, an overheat detector 337, a configuration adjuster 338, and a timer 339. Processor 330 may be configured to execute instructions stored at memory 332 to perform the operations described herein. In some implementations, processor 330 includes or corresponds to controller/processor 280, and memory 332 includes or corresponds to memory 282. Memory 332 may also be configured to store one or more configuration settings 340, mapping information 326. The one or more configuration settings 340 may include one or more configuration settings for UE 115, such as one or more configured SCells, one or more active SCells, PUCCH repetition mode (e.g., scheme), RRC configuration information (e.g., 324), a connectivity configuration (e.g., dual connectivity), or a combination thereof. The one or more indicator values 327 may include values corresponding to one or more indicators, such as one or more indicators included in one or more information elements, as described herein.

Transmitter 334 is configured to transmit data to one or more other devices, and receiver 336 is configured to receive data from one or more other devices. For example, transmitter 334 may transmit data, and receiver 336 may receive data, via a network, such as a wired network, a wireless network, or a combination thereof. For example, UE 115 may be configured to transmit and/or receive data via a direct device-to-device connection, a LAN, a WAN, a modem-to-modem connection, the Internet, intranet, extranet, cable transmission system, cellular communication network, any combination of the above, or any other communications network now known or later developed within which permits two or more electronic devices to communicate. In some implementations, transmitter 334 and receiver 336 may be replaced with a transceiver. Additionally, or alternatively, transmitter 334, receiver, 336, or both may include or correspond to one or more components of UE 115 described with reference to FIG. 2.

Overheat detector 337 is configured to determine whether an overheat condition is present at UE 115. For example, UE 115 may include one or more sensors, such as temperature sensors or thermocouples, coupled to one or more components of UE 115. Overheat detector 337 may receive sensor data, such as temperature data, from the one or more sensors and determine whether there is an overheat condition. For example, overheat detector 227 may compare the sensor data to one or more thresholds, such as a temperature threshold.

Configuration adjuster 338 is configured to adjust a configuration of UE 115. For example, configuration adjuster 338 may be configured to configure or deconfigure one or more SCells, activate or deactivate one or more SCells, adjust a bandwidth, adjust a transmit power, change a modulation scheme, adjust one or more MIMO layers, or a combination thereof. Timer 339 is configured to determine when one or more time periods have elapsed. The one or more time periods may include a time period having a predetermined (e.g., fixed) duration or a time period determined or indicated by another device, such as by base station 105.

During operation of wireless communications system 300, base station 105 may send configuration information 360, such as NR configuration information, to UE 115. Configuration information 360 may include a bandwidth, a modulation scheme, one or more MIMO layers, one or more SCells, or a combination thereof, as illustrative, non-limiting examples. The configuration information 360 may be generated by configuration generator 314. In some implementations, configuration information 360 is included in an RRC configuration, a MAC-CE, or both. To illustrate, a first portion of configuration information 360 may be included in an RRC configuration and a second portion of configuration information 360 may be included in a MAC-CE.

UE 115 receives configuration information 360 and configuration adjuster 338 sets a configuration of UE 115 based on configuration information 360. In some implementations, UE 115 may be configured in LTE standalone (SA), NR SA, or Multi-Radio (MR-DC) (e.g., dual connectivity) including Evolved Universal Terrestrial Radio Access (E-UTRA) New Radio Dual Connectivity (EN-DC), New Radio New Radio (NN-DC), Next-Generation Radio Access Network (NG-RAN) E-UTRA-NR Dual Connectivity (NGEN-DC), or New Radio E-UTRA Dual Connectivity (NE-DC).

During operation of UE 115, overheat detector 337 may detect an overheating condition at UE 115. Based on detection of the overheating condition, UE 115 may perform overheating signaling with base station 105 to change a configuration of UE 115 in an effort to lower a temperature at UE 115. For example, UE 115 may generate one or more indicators to send to base station 105, as described herein.

For example, while in a dual connectivity configuration—in which at least one configuration is a NR configuration—UE 115 may generate and transmit an overheat assistance indicator 361, a reduced UE configuration set indicator 362, an assistance indicator 363, or a combination thereof, as described further herein. For example, in some implementations, a message, such as a UEAssistanceInformation message, may include or correspond to an overheat assistance indicator 361, a reduced UE configuration set indicator 362, or assistance indicator 363. To illustrate, the message may include one or more information elements, such as a first information element associated with overheat assistance indicator 361, a second information element associated with reduced UE configuration set indictor 362, a third information element associated with assistance indicator 363, or a combination thereof. In some implementations, each of the overheat assistance indicator 361, the reduced UE configuration set indicator 362, and assistance indicator 363 may be included in one or more information elements.

Overheat assistance indicator 361 may indicate that UE 115 is in an overheat condition and has NR resources to be deconfigured or deactivated. Reduced UE configuration set indicator 362 may indicate one or more resources for reconfiguring or deactivating. In some implementations, mapping information 326 may be used to determine a value of reduced UE configuration set indicator 362 based on a configuration desired configuration for UE 115. In some such implementations, a particular value of overheat assistance indicator 361 may indicate that reduced UE configuration set indicator 362 is to be applied to NR resources. Assistance indicator 363 may indicate a preference and/or order for reconfiguring and/or deactivating one or more NR resources. Additionally, or alternatively, while in a master cell group (MCG) radio network (RN) configuration, such as a New Radio New Radio Dual Connectivity (NN-DC) configuration, a New Radio E-UTRA Dual Connectivity (NE-DC) configuration, or an Evolved Universal Terrestrial Radio Access New Radio Dual Connectivity Dual Connectivity (EN-DC), UE 115 may generate and transmit assistance indicator 363 corresponding to the overheating condition.

Base station 105 receives overheat assistance indicator 361, reduced UE configuration set indicator 362, assistance indicator 363, or a combination thereof and determines an adjustment for UE 115. For example, configuration generator 314 may determine the adjustment and generate the adjustment indicator 364 to correspond to the adjustment indicator. Base station 105 sends adjustment indicator 364 to UE 115. In some implementations, adjustment indicator 364 may be included in an RRC configuration, such as an RRC message, in a MAC-CE, or both.

In some implementations, base station 105 may communicate with node 390 using inter-node message 365. For example, inter-node message 365 may include at least a portion of overheat assistance indicator 361, reduced UE configuration set indicator 362, or assistance indicator 363. In such implementations, node 390 may determine the adjustment and generate the adjustment indicator 364 to correspond to the adjustment. Node 390 may generate adjustment indicator 364 and send adjustment indicator 364 to UE 115, such as directly to UE 115. In some implementations, node 390 sends adjustment indicator 364 to UE 115 via base station 105.

UE 115 receives adjustment indicator 364 and configuration adjuster 338 adjusts the configuration of UE 115 based on adjustment indicator 364. After adjusting the configuration of UE 115, overheat detector 337 may determine that no overheating condition exists. In response to a determination that no overheating condition exists, UE 115 may signal to base station 105 that the overheating condition has been resolved and UE 115 can resume a pre-overheating configuration (or other configuration using NR resources). For example, to signal base station 105, UE 115 may transmit overheat assistance indicator 361, reduced UE configuration set indicator 362, assistance indicator 363, or a combination thereof.

Based on receiving the signaling from UE 115 indicating that the overheating condition has been resolved, base station 105 may transmit configuration information 360 or adjustment indicator 364 to cause UE 115 to be placed in a pre-overheating configuration (or other configuration using NR resources).

In some implementations, UE 115 and base station 105 may utilize signaling to coordinate reducing NR resources at UE 115. For example, for overheat assistance indicator 361, UE 115 and base station 105 may use overheating assistance signaling to reduce NR resources. To illustrate, the overheating assistance signaling may include Rel-14 LTE signaling, such as Rel-14 LTE overheating assistance signaling, may be used to reduce NR resources. To illustrate, a representative portion of code for Rel-14 LTE signaling (e.g., OverheatingAssistance-r14) may include:

```
OverheatingAssistance-r14 ::=   SEQUENCE {
    reducedUE-Category             SEQUENCE {
        reducedUE-CategoryDL           INTEGER (0..19),
        reducedUE-CategoryUL           INTEGER (0..19)
    }   OPTIONAL
    reducedMaxCCs                  SEQUENCE {
        reducedCCsDL                   INTEGER (0..31),
        reducedCCsUL                   INTEGER (0..31)
    }   OPTIONAL
}
```

In some implementations, overheat assistance indicator 361 may include the reducedMaxCCs information element to reduce NR resources. For example, the reducedMaxCCs information element includes reducedCCsDL and reducedCCsUL, each of which includes an integer value (e.g., an index value) between 0 and 31. For each of reducedCCsDL and reducedCCsUL, the integer range may be divided (e.g., partitioned) such that a first set of numbers corresponds to LTE and a second set of numbers corresponds to NR. To illustrate, 0-15 may be assigned to LTE and 16-31 may be assigned to NR. Alternatively, a different division of the range may be used, such as an indexing assignment in which 0-15 may be assigned to NR and 16-31 may be assigned to LTE. The same or different subranges may be used for both UL and DL. In such an implementation, UE 115 may indicate a reduction of NR CCs by using a value in range 16-31. As an illustrative, non-limiting example, a value of 16 may indicate that 0 NR SCCs are to be used, a value of 17 indicates that 1 NR SCC is to be used, a value of 18 indicates that 2 NR SCCs are to be used, and so on. According to this example, for a reducedCCsDL information element having a value of 16, an expected reconfiguration for UE 115 to receive from the network is to deconfigure (e.g., reconfigure) all NR DL SCCs. Additionally, for the same example, for a reducedCCsUL information element having a value of 17, an expected reconfiguration for UE 115 to receive from the network is to keep one UL SCC but deconfigure all other NR UL SCCs.

It is noted that the network (e.g., base station 105, node 390, or both) may receive overheat assistance indicator 361 (e.g., reduced CCsDL and/or reducedCCsUL) and may decide whether to deactivate the active SCCs or to deconfigure the configured SCCs. The decision (e.g., to deactivate or deconfigure) may be based on whether the SCCs are in FR1 (corresponding to sub6) or FR2 (corresponding to mmW). It is noted, that to deactivate one or more secondary component carriers (SCCs), base station 105 may send a medium access control (MAC)-control element (CE). Alternatively, to deconfigure one or more SCCs, base station 105 may send an RRC configuration message.

In some implementations, a particular value, such as a value of 16 may represent that UE 115 wants to remove NR as a whole. Use of the particular value to indicate to remove NR as a whole may be an alternative to "SCG RLF" signaling (in 38.331 spec) to remove SCG (NR in case of EN-DC).

In some implementations, UE 115 may select a value of the overheat assistance indicator 361 from a plurality of values (e.g., 0-31). A first subset of the plurality of values may correspond to a first configuration, such as an LTE configuration, and a second subset of the plurality of values may correspond to a second configuration, such as an NR configuration. The second subset is distinct from (e.g., non-overlapping with) the first subset. In some implementations, the first subset includes a first set of sequential values and the second subset includes a second set of sequential values.

In some implementations, the index values of reducedCCsDL and reducedCCsUL may not be divided; rather, the UE 115 selects an integer value that corresponds to a desired number of CCs for each of UL and DL, respectively. To illustrate, an index value for reducedCCsDL may represent a total number of resources of a combination of LTE SCells, NR PSCelss, and NR SCells for downlink. An index value for reducedCCsUL may represent a total number of a combination of LTE SCells, NR PSCelss, and NR SCells for uplink. In such an implementation, based on receiving reducedCCsDL and reducedCCsUL, the network (NW), such as base station 105, may may deactivate or deconfigure the SCCs starting with NR resources until the index value is reached. After a number of resources have been deactivated and/or deconfigured based on the index value, if overheating is still present, UE 115 may signal SCG RLF (and thus stop sending the reducedMaxCCs) or send reducedMaxCCs=0 to indicate that UE 115 wants to remove SCG (i.e., NR).

In some implementations, reduced UE configuration set indicator 362 may include or correspond to reducedUE-Category of OverheatingAssistance-r14. For example, the reducedUE-Category information element includes reducedUE-CategoryDL and reducedUE-CatagoryUL, each of which includes an integer value (e.g., an index value) between 0 and 19. To use reducedUE-Category information element, mapping information 326, such as one or more mapping tables, may be used to map different NR configurations to index values of reducedUE-CategoryDL and reducedUE-CategoryUL. Each NR configuration can include aggregated bandwidth, modulation scheme, MIMO layers, frequency range(s), other information, or a combination thereof, as illustrative, non-limiting examples. In some such implementations, mapping information 326 may include multiple mapping tables for each of uplink and downlink, such as a first mapping able for FR1 bands and a second mapping table for FR2 bands.

In implementations where reduced UE configuration set indicator 362 includes reducedUE-Category of OverheatingAssistance-r14, UE 115 may signal a flag to the network (e.g., base station 105) to indicate that the corresponding index values correspond to NR and/or to mapping information 326. For example, UE 115 may use overheat assistance indicator 361, such as reducedMaxCCx—reduced CCsDL and/or reducedCCsUL, to indicate that the corresponding index values correspond to NR or to mapping information 326. To illustrate, a particular value, such as 31, of reduced CCsDL and/or reducedCCsUL may be used in indicate NW to apply reducedUE-CategoryDL and/or reducedUE-CategoryDL for NR.

Figure 4A:
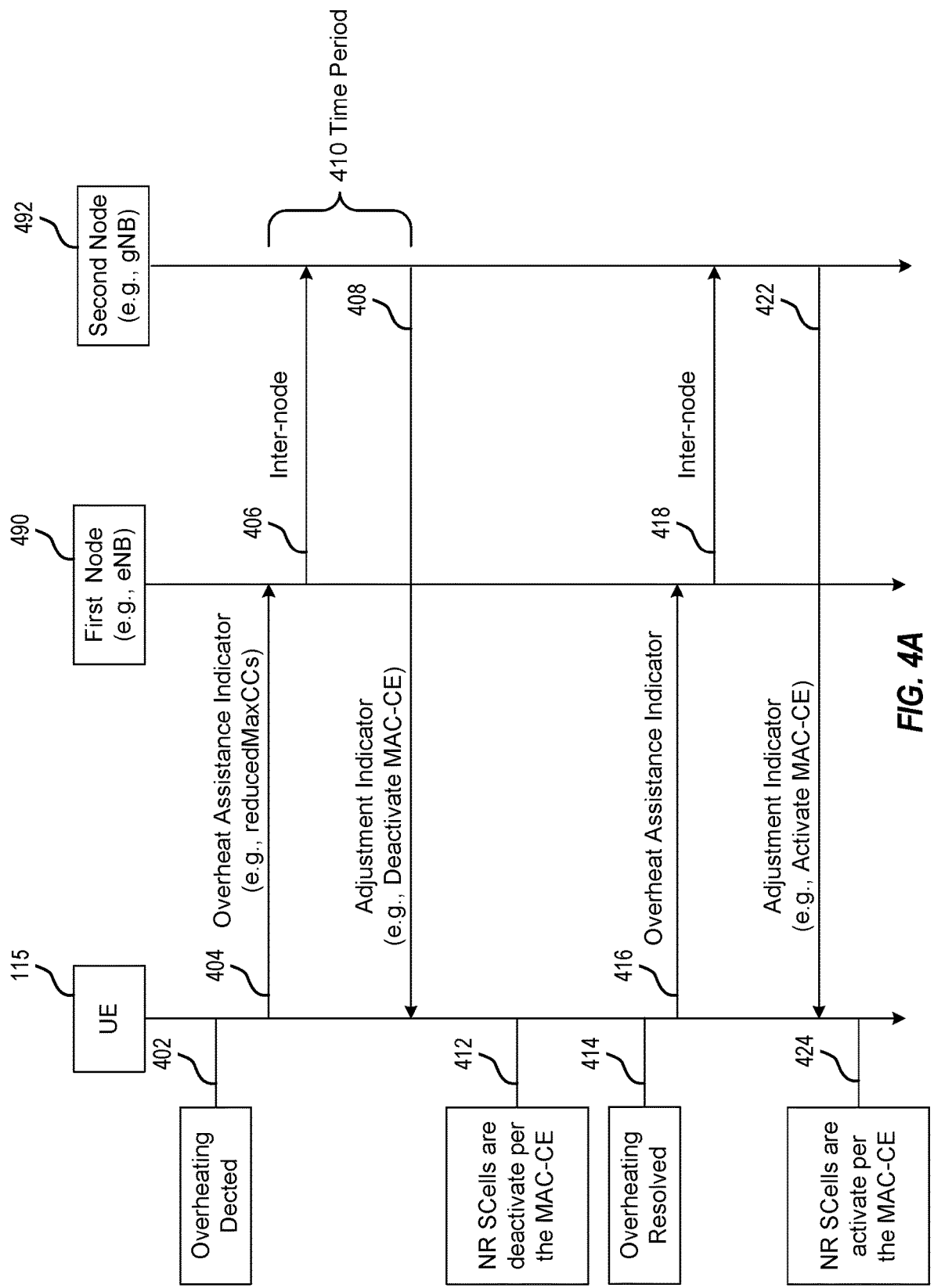
FIGS. 4A and 4B are ladder diagrams illustrating examples of overheating signaling according to aspects of the present disclosure.
Figure 4B:
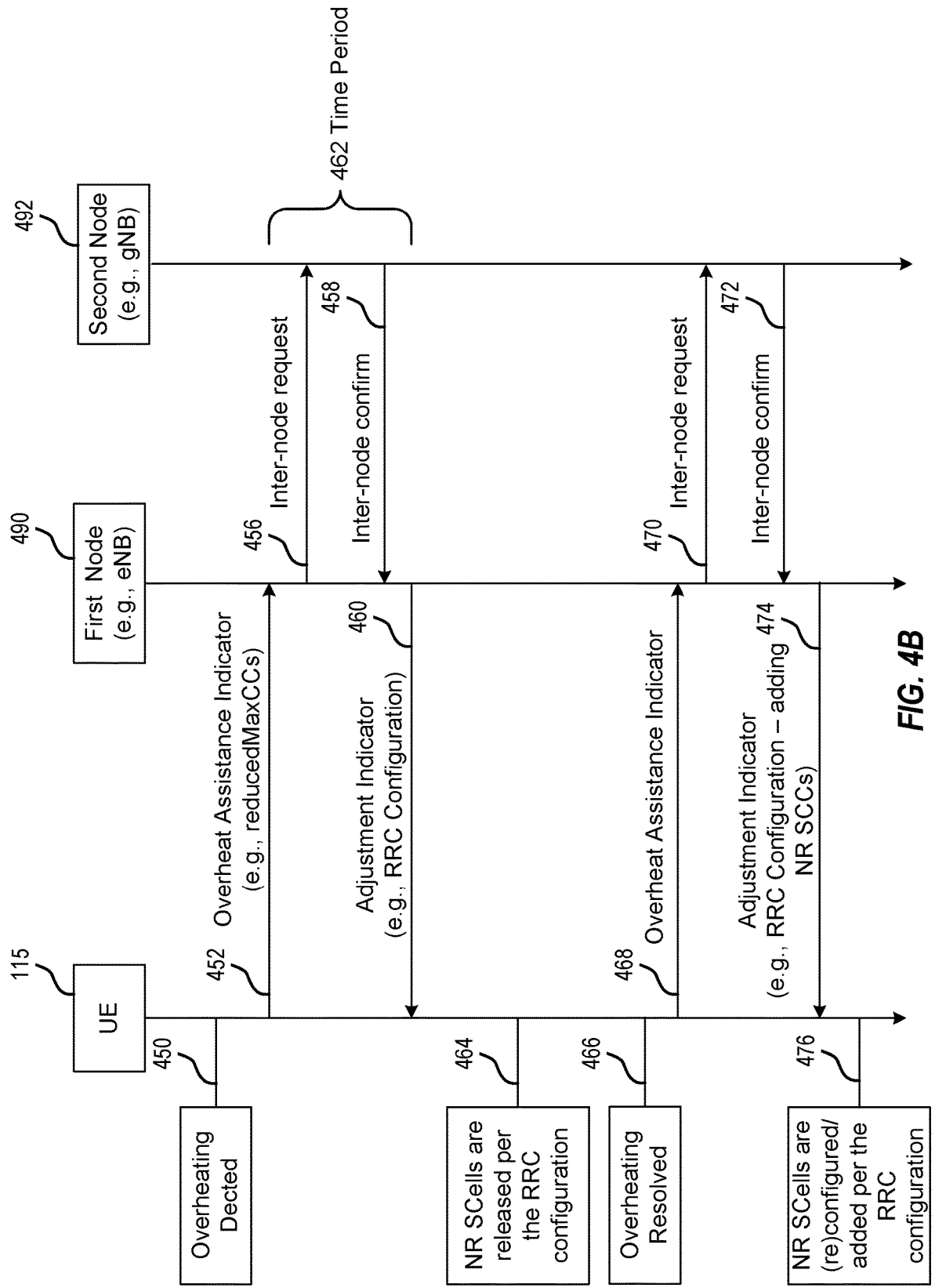

Referring to FIGS. 4A and 4B, examples of using signaling to reduce NR are shown. For example, the signaling may include or correspond to Rel-14 LTE Signaling to Reduce NR. FIGS. 4A and 4B depict ladder diagrams illustrating examples of overheating signaling. For example, FIG. 4A depicts a ladder diagram illustrating an example of deactivating and activating NR secondary cells (SCells), and FIG. 4B depicts a ladder diagram illustrating an example of releasing and adding back NR SCells. As shown in FIGS. 4A and 4B, a system of the ladder diagram includes UE 115, a first node 490 (e.g., a first network device), and a second node 492 (e.g., a second network device). First node 490 and second node 492 may include or correspond to base station 105 or node 390. In some implementations, first node 490 includes an eNB and second node includes a gNB. Although shown and described as being separate, in some implementations, first node 490 and second node 492 may be included in the same device, such as the base station. UE 115, first node 490, and second node 492 may include one or more components and be configured to perform one or more operations, as described with reference to FIGS. 1-3.

Referring to FIG. 4A, during operation, at 402, UE 115 detects overheating. For example, the overheating may be detected by overheat detector 337. At 404, UE 115 transmits an overheat assistance indicator, such as a first overheat assistance indicator, to first node 490. For example, the overheat assistance indicator may include or correspond to overheat assistance indicator 361. In some implementations, the overheat assistance indicator may include or correspond to a reducedMaxCCs information element.

At 406, first node 490 transmits a message, such as an inter-node message, to second node 492. The message may include or correspond to inter-node message 365. In some implementations, the message includes the first overheat assistance indicator. Second node 492 receives the message and determines an adjustment to be performed by UE 115 based on the overheat condition at the UE 115. To illustrate, second node 492 may determine to deactivate one or more SCells at UE 115.

At 408, second node 492 transmits an adjustment indicator, such as a first adjustment indicator, to UE 115. For example, the first adjustment indicator may include or correspond to adjustment indicator 364. To illustrate, the first adjustment indicator may be included in a MAC-CE configured to indicate to deactivate one or more SCells.

It is noted that a time period 410 may be initiated based on communication, such as transmission, of the overheat assistance indicator. The time period, e.g.—a duration of the time period, may be a default value or may be communicated to UE 115 from first node 490 or second node 492. If UE 115 does not receive the adjustment indicator during the time period, UE 115 may initiate one or more corrective actions, such as deactivating NR SCells, releasing one or more NR SCells, entering a low power mode, entering a shutdown mode, etc., to resolve the overheating. As an illustrative, non-limiting example, the time period may be 150 milliseconds. UE 115 may receive the adjustment indicator, at 408, from second node 492 during the time period.

At 412, UE 115 deactivate one or more NR SCells based on the received first adjustment indicator. To illustrate, UE 115 may deactivate the one or more NR SCells per a received MAC-CE. For example, configuration adjuster 338 may deactivate the one or more NR SCells based on the received adjustment indicator.

At 414, UE 115 may detect that the overheating is resolved. For example, the resolution of the overheating may be detected by overheat detector 337. At 416, UE 115 transmits an overheat assistance indicator, such as a second overheat assistance indicator, to first node 490. For example, the overheat assistance indicator may include or correspond to overheat assistance indicator 361. In some implementations, the overheat assistance indicator may include or correspond to a reducedMaxCCs information element. To illustrate, the reducedMaxCCs information element may indicate a max envelop or a value that corresponds to a number of one or more CCs.

At 418, first node 490 transmits a message, such as an inter-node message, to second node 492. The message may include or correspond to inter-node message 365. In some implementations, the message includes the second overheat assistance indicator. Second node 492 receives the message and determines an adjustment to be performed by UE based on the second overheat assistance indicator. To illustrate, second node 492 may determine to activate one or more SCells at UE 115.

At 422, second node 492 transmits an adjustment indicator, such as a second adjustment indicator, to UE 115. For example, the second adjustment indicator may include or correspond to adjustment indicator 364. To illustrate, the second adjustment indicator may be included in a MAC-CE configured to indicate to activate one or more SCells. In some implementations, if UE 115 does not receive the second adjustment indicator within the time period (e.g., 410), UE 115 may retransmit the second overheat assistance indicator.

At 424, UE 115 activates one or more NR SCells based on the received adjustment indicator. To illustrate, UE 115 may activate the one or more NR SCells per the received MAC-CE. For example, configuration adjuster 338 may activate the one or more NR SCells based on the received adjustment indicator.

Thus, FIG. 4A illustrates operations between a UE 115 and a network including first node 490 and second node 492 in which one or more NR SCells are selectively deactivated and activated. By selectively deactivating and activating the one or more NR SCells, UE 115 resolve an overheating condition and resume pre-overheating operations.

Referring to FIG. 4B, during operation, at 450, UE detects overheating. For example, the overheating may be detected by overheat detector 337. At 454, UE 115 transmits an overheat assistance indicator, such as a first overheat assistance indicator, to first node 490. For example, the overheat assistance indicator may include or correspond to overheat assistance indicator 361. In some implementations, the overheat assistance indicator may include or correspond to a reducedMaxCCs information element.

At 456, first node 490 transmits a message, such as an inter-node message (e.g., an inter-node request), to second node 492. The message may include or correspond to inter-node message 365. In some implementations, the message includes the first overheat assistance indicator.

Second node 492 receives the message and may determine an adjustment to be performed by UE based on the overheat condition at the UE. To illustrate, second node 492 may determine to release one or more SCells at UE 115 to update an RRC configuration and may communicate the update to first node 490 via an inter-node message. In other implementations, second node 492 receives the message and may provide a confirmation to first node 490. For example, at 458, second node 492 transmits a message, such as an inter-node message (e.g., an inter-node confirmation message), to first node 490.

In some implementations, first node 490 may determine an adjustment to be performed by UE based on the overheat condition at the UE. For example, first node 490 may determine to adjust the RRC configuration to release one or more NR SCells at UE 115. First node 490 may determine the adjustment based on the first overheat assistance indicator, the inter-node confirmation message, or both. In some implementations, first node 490 determines the adjustment based on the first overheat assistance indicator and independent of the inter-node confirmation message.

At 460, first node 490 transmits an adjustment indicator, such as a first adjustment indicator, to UE 115. For example, the first adjustment indicator may include or correspond to adjustment indicator 364. To illustrate, the first adjustment indicator may be included in an RRC configuration, such as an RRC message, to indicate to release one or more SCells. Although the adjustment indicator is shown as being sent after the inter-node request and the inter-node confirm, in other implementations, the adjustment indicator may be sent prior to the inter-node confirmation message or prior to both the inter-node request message and the inter-node confirmation message.

It is noted that a time period 462 may be initiated based on communication, such as transmission, of the overheat assistance indicator. The time period, e.g.,—a duration of the time period, may be a default value or may be communicated to UE 115 from first node 490 or second node 492. If UE 115 does not receive the adjustment indicator during the time period, UE 115 may initiate one or more corrective actions, such as deactivating NR SCells, releasing one or more NR SCells, entering a low power mode, entering a shutdown mode, etc., to resolve the overheating. As an illustrative, non-limiting example, the time period may be 150 milliseconds. UE 115 may receive the adjustment indicator, at 408, from first node 490 during the time period.

At 464, UE 115 releases one or more NR SCells based on the received first adjustment indicator. To illustrate, UE 115 may release the one or more NR SCells per a received RRC configuration. For example, configuration adjuster 338 may release the one or more NR SCells based on the received adjustment indicator.

At 466, UE 115 may detect that the overheating is resolved. For example, the resolution of the overheating may be detected by overheat detector 337. At 468, UE 115 transmits an overheat assistance indicator, such as a second overheat assistance indicator, to first node 490. For example, the overheat assistance indicator may include or correspond to overheat assistance indicator 361. In some implementations, the overheat assistance indicator may include or correspond to a reducedMaxCCs information element. To illustrate, the reducedMaxCCs information element may indicate a max envelop or a value that corresponds to a number of one or more CCs.

At 470, first node 490 transmits a message, such as an inter-node message (e.g., an inter-node request message), to second node 492. The message may include or correspond to inter-node message 365. In some implementations, the message includes the second overheat assistance indicator. Second node 492 may determine to update a RRC configuration at UE 115. For example, second node 492 may determine to adjust the RRC configuration to configure (e.g., reconfigure or add) one or more NR SCells at UE 115 and may communicate the adjustment to first node 490 via an inter-node message. In other implementations, second node 492 receives the message and may provide a confirmation to first node 490. For example, at 472, second node 492 transmits a message, such as an inter-node message (e.g., an inter-node confirmation message), to first node 490.

In some implementations, first node 490 may determine an adjustment to be performed by UE based on the second overheat assistance indicator. For example, first node 490 may determine to adjust the RRC configuration to configure (e.g., reconfigure or add) one or more NR SCells at UE 115. First node 490 may determine the adjustment based on the second overheat assistance indicator, the inter-node confirmation message (at 472), or both. In some implementations, first node 490 determines the adjustment based on the second overheat assistance indicator and independent of the inter-node confirmation message (at 472).

At 474, first node 490 transmits an adjustment indicator, such as a second adjustment indicator, to UE 115. For example, the second adjustment indicator may include or correspond to adjustment indicator 364. To illustrate, the second adjustment indicator may be included in an RRC configuration to indicate to configure (e.g., reconfigure or add) one or more SCells. Although the adjustment indicator is shown as being sent after the inter-node request (at 470) and the inter-node confirm (at 472), in other implementations, the adjustment indicator may be sent prior to the inter-node confirmation message (at 472) or prior to both the inter-node request message (at 470) and the inter-node confirmation message (at 472). In some implementations, if UE 115 does not receive the second adjustment indicator within the time period (e.g., 410), UE 115 may retransmit the second overheat assistance indicator.

At 476, UE 115 configures (e.g., reconfigures or adds) one or more NR SCells based on the received adjustment indicator. To illustrate, UE 115 may configure the one or more NR SCells per the received RRC configuration. For example, configuration adjuster 338 may configure the one or more NR SCells based on the received adjustment indicator.

Thus, FIG. 4B illustrates operations between a UE 115 and a network including first node 490 and second node 492 in which one or more NR SCells are selectively deconfigured and reconfigured. By selectively deconfiguring and reconfiguring the one or more NR SCells, UE 115 resolve an overheating condition and resume pre-overheating operations.

Referring to FIG. 3, assistance indicator 363 may be configured to provide preference and/or ordering for overheating signaling. For example, assistance indicator 363 may be configured to provide information indicating an order in which UE 115 would like the network (NW) (e.g., base station 105) to reduce an NR configuration. To illustrate, assistance indicator 363 may include a sequence of values, such as weight or preference values, corresponding to an ordered list of items/configurations.

In some implementations, assistance indicator 363 may be included in UEAssistanceInformation-v1540-IEs. To illustrate, a representative portion of code for UEAssistanceInformation-v1540-IEs may include:

may have the same value and the NW (e.g., base station 105) may determine an order between the two or more categories. In some implementation, assistance indicator 363 may include separate preferenceOrders for uplink and downlink, such as preferenceOrderUL and preferenceOrderDL. Alternatively, a single preferenceOrder may accommodated both uplink and downlink. For example, preferenceOrder::=ENUMERATED {reducedCCsDL, reducedCCsUL, reducedBW-FR1-DL, reducedBW-FR1-UL, reducedBW-FR2-DL, reducedBW-FR2-UL, reducedMIMO-LayersFR1-DL, reducedMIMO-LayersFR1-UL, reducedMlMO-LayersFR2-DL, reducedMIMO-LayersFR2-UL}

In some implementations, assistance indicator 363 may be used when UE 115 is in an NN-DC configuration, an NE-DC configuration, or an EN-DC configuration. Additionally, assistance indicator 363 may be used when UE 115 is in an MCG RN configuration, such as when UE 115 is in the NN-DC configuration, the NE-DC configuration, or the EN-DC. Assistance indicator 363 may be included in or correspond to one or more of the UEAssistanceInformation-v1540 information elements. To illustrate, in some implementations, the UEAssistanceInformation-v1540 information elements may include a first set of IEs for SCG and a second set of IEs for MCG. For example, each set may include reduceMaxCCs, reducedMaxBW-FR1, reducedMaxBW-FR2, reducedMaxMIMO-Layers-FR1, reducedMaxMIMO-Layers-FR2. In some such implementations, either of a master node (MN) or a secondary node (SN) may control the signalling with UE 115.

```
UEAssistanceInformation-v1540-IEs ::=   SEQUENCE {
    Overheating Assistance          OverheatingAssistance       OPTIONAL,
    nonCriticalExtension            SEQUENCE { }                OPTIONAL
}
OverheatingAssistance ::=       SEQUENCE {
    reduceMaxCCs                    SEQUENCE {
      reducedCCsDL                      INTEGER (0 ..31),
      reduced CCsUL                     INTEGER (0 ..31)
    } OPTIONAL,
    reducedMaxBW-FR1                SEQUENCE {
      reducedBW-FR1-DL                      ReducedAggregatedBandwidth,
      reducedBW-FR1-UL                      ReducedAggregatedBandwidth
    } OPTIONAL,
    reducedMaxBW-FR2                SEQUENCE {
      reducedBW-FR2-DL                      ReducedAggregatedBandwidth,
      reducedBW-FR2-UL                      ReducedAggregatedBandwidth
    } OPTIONAL,
    reducedMaxMIMO-Layers-FR1       SEQUENCE {
      reducedMIMO-LayersFR1-DL          MIMO-LayersDL,
      reducedMIMO-LayersFR1-UL          MIMO-LayersUL,
    } OPTIONAL,
    reducedMaxMIMO-Layers-FR2         SEQUENCE {
      reducedMIMO-LayersFR2-DL          MIMO-LayersDL,
      reducedMIMO-LayersFR2-UL          MIMO-LayersUL,
    } OPTIONAL,
}
```

In some implementations, assistance indicator 363 may be included in UEAssistanceInformation-v1540-IEs as "preferred ordering", such as preferenceOrder::=ENUMERATED {reduceMaxCCs, reducedMaxBW-FR1, reducedMaxBW-FR2, reducedMaxMIMO-Layers-FR1, reducedMaxMIMO-Layers-FR2}. An interpretation of enumerated values {1, 2, 4, 3, 5} may be reduce Max CC first, then reducedMaxBW-FR1, then reducedMaxMIMO-LayersFR1, then reducedMaxBW-FR2, and finally reducedMaxMIMO-LayersFR2. In such implementations, the preference order is indicated in an ascending order. Alternatively, the preference order may be indicated in a descending order. It is also noted that two or more categories In another implementation when UE 115 is in MCG RN configuration, assistance indicator 363 may be included in or correspond to one or more of the UEAssistanceInformation-v1540 information elements and each of the information elements may include a flag. The flag may indicate whether the corresponding information element applies to MCG, SCG, or both.

In some implementations, such as one or more implementations that include overheat assistance indicator 361, reduced UE configuration set indicator 362, and/or assistance indicator 363, values of the indicators may be public land mobile network (PLMN)-based. For example, different PLMNs (e.g., different vendors or different service providers) may have different assignment of the indexes and/or interpretation of the configuration as indicated by those indexes. UE 115 may look up a current PLMN before initiating signaling corresponding to that PLMN.

In some implementations, such as one or more implementations that include overheat assistance indicator 361, reduced UE configuration set indicator 362, and/or assistance indicator 363, UE 115 may determine if adjustment indicator 364 is received within a time period after the indication (e.g., 361, 362, 363) is transmitted. For example, if the time period elapses and the NW (e.g., base station 150) has not sent adjustment indicator 364, UE 115 may initiate internal thermal mitigation, such as removing SCCs one at a time. In some implementations, the time period may be fixed, such as 150 ms. In other implementations, the time period may be configurable, such as by UE 115 or by the NW (e.g., base station 150).

In some implementations, after adjustment by UE 115 and a determination that the overheating condition is resolved, UE 115 may send another indication (e.g., 361, 362, 363) to (re)configure or activate one or more NR resources. For example, overheat assistance indicator 361, such as reducedCCsDL and reducedCCsUL, may be set to either the max envelope or, alternatively, a value of 31. Additionally, or alternatively, reduced UE configuration set indicator 362, such as reducedUE-CategoryDL or reducedUE-CategoryUL, can be set to the highest envelope (or maximum integer: 19 for DL and 21 for UL). Upon the NW, such as base station 150 or node 390, receiving such an indicator from UE 115, NW may send adjustment indicator 36 or configuration information 360 to enable a capability/bandwidth at UE 115 by having UE 115 activate or add one or more SCCs.

In some implementations, to reduce or add one or more NR resources based on an overheating condition being detected or resolved, UE 115 may send multiple indications in serial to NW, where each indication correspond to a different NR resource. The order of the transmission of the multiple indications may indicate or correspond to an order in which one or more NR resources are to be deconfigured/deactivated or (re)configured/activated.

In some implementations, UE 115 may set contents of a message. For example, UE 115 may set the contents of the message while in a dual connectivity configuration, such as an EN-DC configuration, as an illustrative, non-limiting example. To illustrate, UE 115 may set one or more fields or one or more information elements of the message, such as a UEAssistanceInformation message, for overheating assistance indication. UE 115 configured to provide an overheating assistance indicator, such as overheat assistance indicator 361, may determine whether UE 115 is in an overheat condition—e.g., is experiencing internal overheating.

Based on a determination of the overheat condition, UE 115 may reduce a DL category, a UL category, or a combination thereof. To illustrate, UE 115 may include reducedUE-Category in an OverheatingAssistance IE, set reducedUE-CategoryDL to a number to reduce a DL category of UE 115, set reducedUE-CategoryUL to a number to reduce a UL category of UE 115, or a combination thereof. Additionally, or alternatively, based on a determination of the overheat condition, UE 115 may reduce a number of maximum secondary component carriers. To illustrate, UE 115 may include reducedMaxCCs in the OverheatingAssistance IE, set reducedCCsDL to the number of maximum SCells to be configured in downlink, set reducedCCsUL to the number of maximum SCells to be configured in uplink, or a combination thereof. Additionally, or alternatively, based on a determination of the overheat condition, UE 115 may provide overheating assistance indication for NR SCG. To illustrate, UE 115 may include overheatingAssistanceForSCG in the OverheatingAssistance IE, or may set overheatingAssistanceForSCG in accordance with a predefined standard.

In some implementations, based on a determination that UE 115 is not in an overheating condition, UE 115 may include reducedUE-Category, reducedMaxCCs and overheatingAssistanceForSCG (if configured to provide overheating assistance indication for NR SCG) in OverheatingAssistance IE.

As described with reference to FIG. 3, overheating signaling may be performed between UE 114 and base station 105 to indicate an overheating condition at UE 115. To illustrate, UE 115 may be able to indicate the overheating condition when configured in LTE SA, NR SA, or MR-DC. Additionally, UE 115 may be able to communicate an order or preference in which NR resources are deconfigured or deactivated. The overheating signaling described herein thus enables UE 115 to resolve an overheating condition and thereby avoiding damage to one or more components of UE 115 and negatively impacting a user experience.

Figure 11:
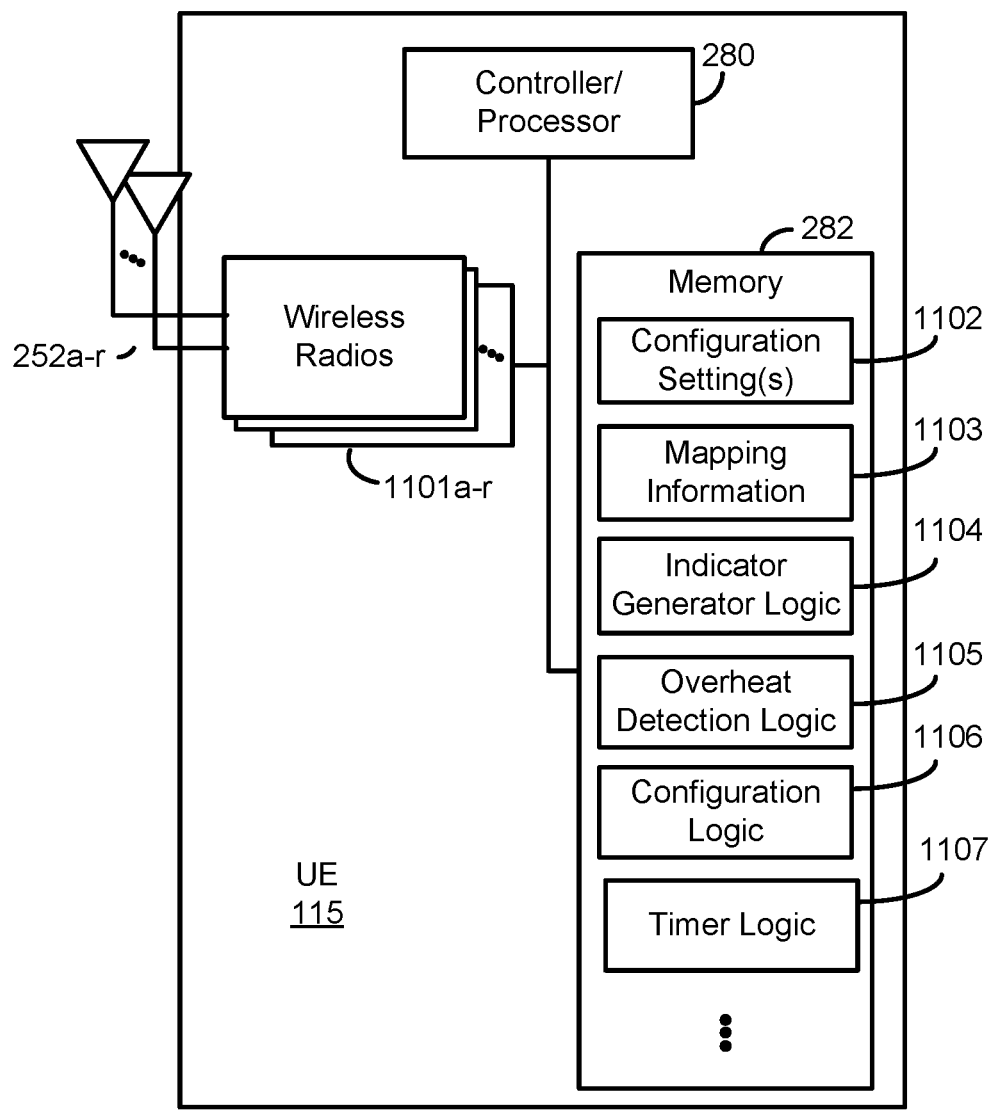
FIG. 11 is a block diagram conceptually illustrating a design of a UE configured to support overheating signaling.
Figure 12:
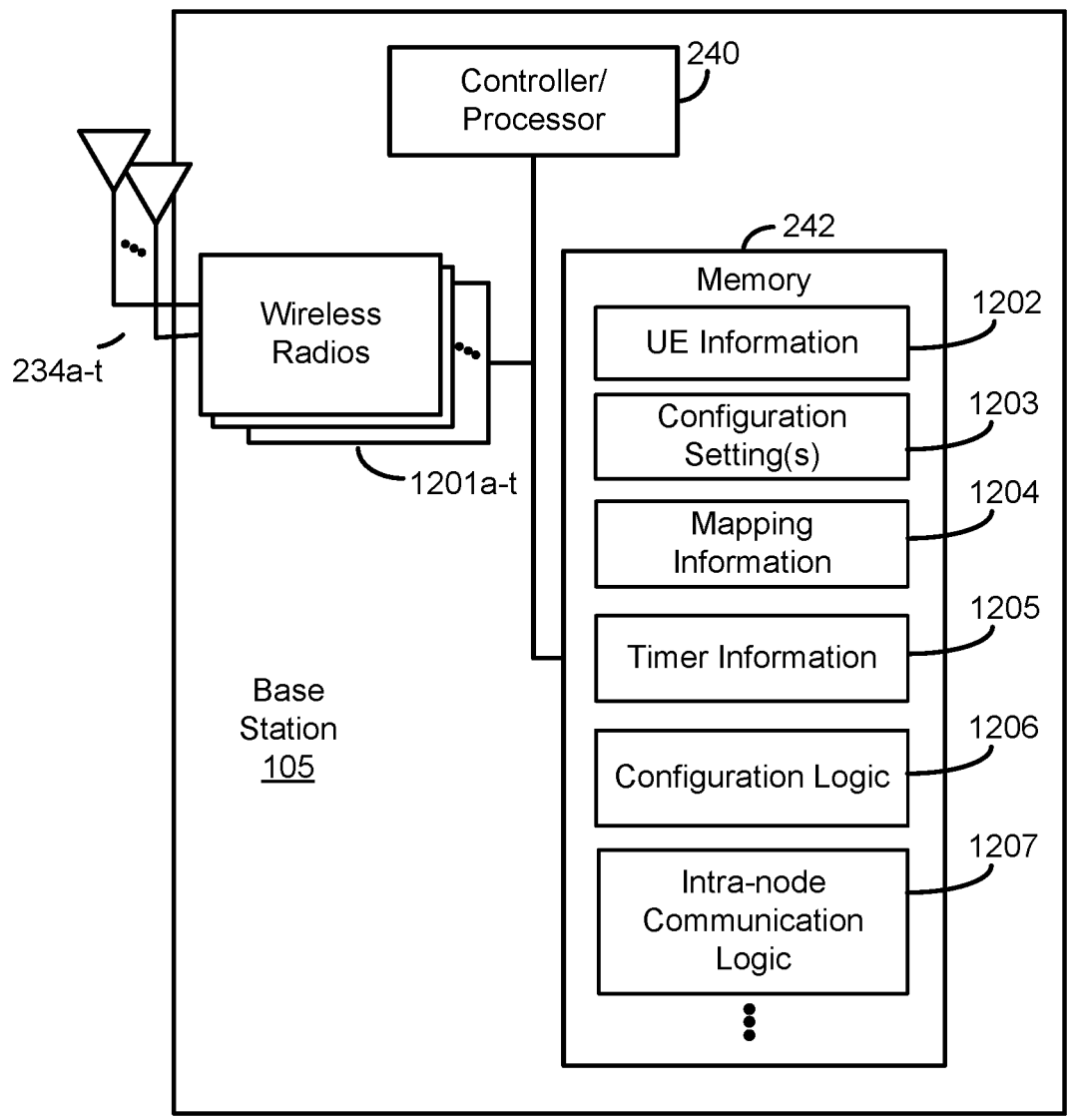
FIG. 12 is a block diagram conceptually illustrating a design of a base station configured to support overheating signaling.

FIGS. 5-7 are block diagrams illustrating example blocks executed by a UE configured according to one or more aspects of the present disclosure. The example blocks will also be described with respect to UE 115 as illustrated in FIG. 11. FIG. 11 is a block diagram illustrating UE 115 configured according to one aspect of the present disclosure. UE 115 includes the structure, hardware, and components as illustrated for UE 115 of FIG. 2 or 3. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1101*a-r* and antennas 252*a-r*. Wireless radios 1101*a-r* includes various components and hardware, as illustrated in FIG. 2 for UE 115, including modulator/demodulators 254*a-r*, MIMO detector 256, receive processor 258, transmit processor 264, and TX MIMO processor 266. As shown, memory 282 may include configuration setting(s) 1102, mapping information 1103, indicator generator logic 1104, overheat detection logic 1105, configuration logic 1106, and timer logic 1107. Configuration setting(s) 1102 and mapping information 1103 may include or correspond to configuration setting(s) 340 and mapping information 326, respectively. Indicator generator logic 1104 may include or correspond to processor 330. Overheat detection logic 1105 may include or correspond to overheat detector 337. Configuration logic 1106 may include or correspond to configuration adjuster 338. Timer logic 1107 may include or correspond to timer 339. In some aspects, indicator generator logic 1104, overheat detection logic 1105, configuration logic 1106, timer logic 1107, or a combination thereof, may include or correspond to processor(s) 280. UE 115 may receive signals from and/or transmit signal to a base station, such as base station 105 of FIG. 3, node 390 (e.g., a network device) of FIG. 3, or base station 105 as illustrated in FIG. 12.

Referring to FIG. 5, at block 500, the UE, while in a dual connectivity configuration, transmits an overheat assistance indicator corresponding to an overheating condition at the UE. To illustrate, transmit the overheat assistance indicator via wireless radios 1101*a-r* and antennas 252*a-r*. The overheat assistance indicator may include or correspond to overheat assistance indicator 361.

At block 501, the UE, after sending the overheat assistance indicator and based on the overheating condition, performs an adjustment on an NR configuration. To illustrate, the UE may adjust one or more configuration settings 1102, one or more of wireless radios 1101*a-r*, or both, using configuration logic 1106.

In some implementations, a block may be included in which the UE detects the overheating condition. To illustrate, the UE may detect the overheating condition using overheat detection logic 1105. In some implementations, a block may be included in which the UE may generate the overheat assistance indicator based on the detected overheating condition. The overheat assistance indicator is included in overheating assistance signaling transmitted from the UE to a network, such as a base station 105, node 390, or both. To illustrate, the UE may generate the overheat assistance indicator using indicator generator logic 1104.

In some implementations, a block may be included in which the UE determines that the overheating condition is resolved. In such implementations, UE may transmit another overheat assistance indicator to modify the adjusted NR configuration to activate or configure one or more NR capabilities.

In some implementations, the overheat assistance indicator has a first value that indicates a sum of a desired number of a combination of LTE SCells, NR PSCell, and NR SCells for downlink, and a second value that indicates a sum of a desired number of a combination of LTE SCells, NR PSCell, and NR SCells for uplink. In some such implementations, UE may deactivate or deconfigure NR SCells prior to LTE secondary cells and the NR PSCell; and deactivate or deconfigure the NR PSCell prior to the LTE secondary cells. Additionally, after deactivating or deconfiguring all NR SCCs, the UE may determine the overheating condition is present, and requesting removal of an SCG.

The overheat assistance indicator may be included in an information element. For example, the information element may include a reduced CCs DL information element or a reduced CCs UL information element. Additionally, or alternatively, the overheat assistance indicator has a value that indicates that the overheat assistance indicator corresponds to the NR configuration. The overheat assistance indicator may have a first value indicates to deconfigure all NR SCCs for DL or UL. Additionally, the overheat assistance indicator may have a second value indicates to keep one NR SCC and to deconfigure all other NR SCCs for DL or UL.

In some implementations, a block may be included in which the UE selects a value of the overheat assistance indicator from a plurality of values. To illustrate, the UE may select the value indicator using configuration logic 1106. A first subset of the plurality of values corresponds to a first configuration and a second subset of the plurality of values corresponds to a second configuration, where the second subset distinct from the first subset. In some implementations, the first subset includes a first set of sequential values, the second subset includes a second set of sequential values, and the second configuration is the NR configuration. In some such implementations, the first configuration is an LTE configuration. In a particular implementations, each value of the second set of sequential values is less than each value of the first set of sequential values.

In some implementations, a block may be included in which the UE receives, responsive to the overheat assistance indicator, an adjustment indicator. The adjustment is performed by the UE responsive to receiving the adjustment indicator. Performing the adjustment may include deconfiguring one or more SCCs. The one or more SCCs are included in a first frequency range (e.g., FR1) or a second frequency range (e.g., FR2). In some implementations, a block may be included in which the UE receives an RRC configuration and the adjustment is performed by the UE based on the RRC configuration message.

In some implementations, performing the adjustment includes deactivating one or more SCCs. The one or more SCCs are included in a first frequency range (e.g., FR1) or a second frequency range (e.g., FR2). Additionally, a block may be included in which the UE receives a MAC-CE and the adjustment is performed by the UE based on the MAC-CE.

In some implementations, a block may be included in which the UE detects the overheating condition. In such implementations, the UE may determine a desired NR configuration based on the detected overheating condition and generate a reduced UE configuration set indicator based on the desired NR configuration. Additionally, the UE may transmit the reduced UE configuration set indicator. The reduced UE category indicator may be included in a reduced UE configuration set information element. Additionally, the desired NR configuration includes an aggregated bandwidth, a modulation scheme, one or more MIMO layers, another parameter, or a combination thereof.

In some implementations, generating the reduced UE configuration set indicator includes mapping, by the UE, the desired NR configuration to a value of the reduced UE configuration set indicator based on a mapping table. The mapping table may include a reduced UE configuration set mapping table for NR UL or a reduced UE configuration set mapping table for NR DL. In some implementations, the reduced UE configuration set mapping table for NR UL includes a first mapping table for a first frequency range and a second mapping table for a second frequency range. Additionally, or alternatively, the reduced UE category mapping table for NR DL may include a first mapping table for a first frequency range and a second mapping table for a second frequency range. In some such implementations, the overheat assistance indicator is set to a particular value to indicate that a reduced UE category indicator corresponds to NR.

In some implementations, a block may be included in which the UE identifies a PLMN vendor. A value of the overheat assistance indicator or a value of the reduced UE category indicator may be determined based on the identified PLMN vendor.

After transmitting the overheat assistance indicator, the UE may determine whether an adjustment indicator is received during a time period. The UE may receive a value of a duration of the time period from the network, such as base station 105. The time period may be tracked using timer logic 1107. After expiration of the time period, the adjustment is performed by the UE based on a determination that the adjustment indicator was not received during the time period. In some implementations, performing the adjustment includes removing an SCC.

Referring to FIG. 6, at block 600, the UE generates an assistance indicator corresponding to an overheating condition at the UE. The assistance indicator indicating an adjustment order preference. To illustrate, the UE may generate the assistance indicator using indicator generator logic 1104 The assistance indicator may include or correspond to assistance indicator 363.

At block 601, the UE transmits the assistance indicator. To illustrate, the UE may transmit the assistance indicator via wireless radios 1101*a-r* and antennas 252*a-r*.

In some implementations, a block may be included in which the UE detects the overheating condition. Additionally, the UE may receive, responsive to the assistance indicator, an adjustment indicator and perform an adjustment on an NR configuration. The assistance indicator may include one or more values to indicate the adjustment order preference. Each value of the one or more values corresponding to a different adjustment option of one or more adjustment options.

In some implementations, the assistance indicator includes a plurality of values arranged according to a sequence of a plurality of adjustment options. The plurality of values may include a plurality of weight values. Two or more adjustment options of the plurality of adjustment options may have the same value. The plurality of adjustment options may include a number of component carriers, a bandwidth of a first frequency range, a number of MIMO layers for the first frequency range, a bandwidth of a second frequency range, a number of MIMO layers for the second frequency range, or a combination thereof. For each adjustment option of the plurality of adjustment options, the plurality of values includes an UL value, a DL value, or both.

In some implementations, the assistance indicator is included in an information element. For example, the information element is included in UEAssistanceInformation-v1540 information elements.

In some implementations, a block may be included in which the UE identifies a PLMN vendor. One or more values of the assistance indicator, one or more adjustment options corresponding to the assistance indicator, or both, may be determined based on the identified PLMN vendor.

In some implementations, after transmitting the assistance indicator, the UE may determine whether an adjustment indicator is received during a time period. In such implementations, after expiration of the time period, an adjustment may be performed by the UE on the NR configuration based on a determination that the adjustment indicator was not received during the time period. Performing the adjustment may include removing an SCC. The UE may receive a value of a duration of the time period from the network, such as from base station 105.

In some implementations, a block may be included in which the UE generates, while in a dual connectivity configuration, an overheat assistance indicator based on the overheating condition. The UE may transmit the generated overheat assistance indicator.

In some implementations, a block may be included in which the UE transmits multiple assistance indicators, each of the multiple assistance indicators may correspond to a different adjustment option. A transmission order of the assistance indicators may correspond to the adjustment order preference.

Referring to FIG. 7, at block 700, the UE, while in an MCG RN configuration, generates an assistance indicator corresponding to an overheating condition at the UE. To illustrate, the UE may generate the assistance indicator using indicator generator logic 1104 The MCG RN may include an NN-DC configuration, an NE-DC configuration, or an EN.DC configuration. In some implementations, the assistance indicator is included in an information element. For example, the information element may be included in at least one UEAssistanceInformation-v1540 information elements.

At block 701, the UE transmits the assistance indicator. To illustrate, the UE may transmit the assistance indicator via wireless radios 1101a-r and antennas 252a-r.

In some implementations, a block may be included in which the UE generates an SCG indicator corresponding to the assistance indicator and transmits the SCG indicator. After transmitting the assistance indicator, the UE may receive an adjustment indicator from an MN responsive to the assistance indicator. In some implementation, the UE may perform an adjustment on an NR configuration based on the adjustment indicator.

In some implementations, after transmitting the assistance indicator, the UE may receive an adjustment indicator from an SN responsive to the assistance indicator. In such implementation, the UE may perform an adjustment on an NR configuration. The SN may be configured for inter-node messaging with an MN for coordination corresponding to the adjustment indicator.

In some implementations, the UE may transmit one or more information elements, such as one or more UEAssistanceInformation-v1540 information elements. At least one information element of the one or more information elements includes the assistance indicator. Additionally, or alternatively, at least one information element of the one or more information elements includes a flag configure to indicate whether the corresponding at least one information element corresponds to the MCG, the SCG, or both.

It is noted that one or more blocks (or operations) described with reference to FIGS. 5-7 may be combined with one or more blocks (or operations) of another of figure. For example, one or more blocks of FIGS. 5-7 may be combined with one or more blocks (or operations) of another of FIG. 2, 3, or 11. Additionally, or alternatively, one or more operations described above with reference to FIGS. 1-4 may be combine with one or more operations described with reference to FIG. 5-7.

FIGS. 8-10 are block diagrams illustrating example blocks executed by a base station configured according to one or more aspects of the present disclosure. The example blocks will also be described with respect to base station 105 as illustrated in FIG. 12, which may include or correspond to base station 105 or node 390. FIG. 12 is a block diagram illustrating base station 105 configured according to one aspect of the present disclosure. Base station 105 includes the structure, hardware, and components as illustrated for base station 105 of FIGS. 2-4. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 2101a-t and antennas 234a-t. Wireless radios 1201a-t includes various components and hardware, as illustrated in FIG. 2 for base station 105, including modulator/demodulators 232a-t, transmit processor 220, TX MIMO processor 230, MIMO detector 236, and receive processor 238. As shown, memory 242 may include UE information 1202, configuration setting(s) 1203, mapping information 1204, timer information 1205, configuration logic 1206, and intra-node communication logic 1207. UE information 1202, configuration setting(s) 1203, mapping information 1204, and timer information 1205 may include or correspond to UE information 320, configuration setting(s) 324, mapping information 326, and timer information 328. Configuration logic 2106 may include or correspond to configuration generator 314. Intra-node communication logic 1207 may include or correspond to processor 302, transmitter 310, receiver 312, or a combination thereof. In some aspects, configuration logic 1206, intra-node communication logic 1207, or both, may include or correspond to processor(s) 302. Base station 105 may receive signals from and/or transmit signal to a UE, such as UE 115 as illustrated in FIG. 11, or with a node (e.g., 390), such as another base station (e.g., 105).

Referring to FIG. 8, at block 800, the base station receives, from a user equipment (UE) in a dual connectivity configuration, an overheat assistance indicator corresponding to an overheating condition at the UE. To illustrate, the base station may receive the overheat assistance indicator via wireless radios 1201*a-t* and antennas 234*a-t*. The overheat assistance indicator may include or correspond to overheat assistance indicator 361.

At block 801, the base station transmits, based on the overheat assistance indicator, an adjustment indicator corresponding to an adjustment of an NR configuration at the UE. To illustrate, the base station may transmit the adjustment indicator via wireless radios 1201*a-t* and antennas 234*a-t*. The adjustment indicator may include or correspond to adjustment indicator 364.

Referring to FIG. 9, at block 900, the base station receives, from a user equipment (UE), an assistance indicator corresponding to an overheating condition at the UE, the assistance indicator indicating an adjustment order preference. To illustrate, the base station may receive the assistance indicator via wireless radios 1201*a-t* and antennas 234*a-t*. The assistance indicator may include or correspond to assistance indicator 363.

At block 901, the base station transmits, based on the assistance indicator, an adjustment indicator corresponding to an adjustment at the UE. To illustrate, the base station may transmit the adjustment indicator via wireless radios 1201*a-t* and antennas 234*a-t*. The adjustment indicator may include or correspond to adjustment indicator 364.

Referring to FIG. 10, at block 1000, the base station receives, from a UE in an MCG RN configuration, an assistance indicator corresponding to an overheating condition at the UE. To illustrate, the base station may receive the assistance indicator via wireless radios 1201*a-t* and antennas 234*a-t*. The assistance indicator may include or correspond to assistance indicator 363. In some implementations, the MCG RN includes a New Radio New Radio Dual Connectivity (NN-DC) configuration, a New Radio E-UTRA Dual Connectivity (NE-DC) configuration, or an Evolved Universal Terrestrial Radio Access New Radio Dual Connectivity Dual Connectivity (EN-DC) configuration.

At block 1001, the base station transmits, based on the assistance indicator, an adjustment indicator corresponding to an adjustment of the NR configuration at the UE. To illustrate, the base station may transmit the adjustment indicator via wireless radios 1201*a-t* and antennas 234*a-t*. The adjustment indicator may include or correspond to adjustment indicator 364.

It is noted that one or more blocks (or operations) described with reference to FIG. 8-10 may be combined with one or more blocks (or operations) of another of figure. For example, one or more blocks of FIGS. 8-10 may be combined with one or more blocks (or operations) of another of FIG. 2, 3, or 12. Additionally, or alternatively, one or more operations described above with reference to FIGS. 1-4 may be combine with one or more operations described with reference to FIGS. 8-10.

In some aspects, techniques for supporting overheating signaling may include additional aspects, such as any single aspect or any combination of aspects described below or in connection with one or more other processes or devices described elsewhere herein. In some aspects, supporting overheating signaling may include an apparatus configured to transmit, while in a dual connectivity configuration, an overheat assistance indicator corresponding to an overheating condition at the apparatus. The apparatus is further configured to, after sending the overheat assistance indicator and based on the overheating condition, perform an adjustment on an NR configuration. In some implementations, the apparatus includes a wireless device, such as a UE. In some implementations, the apparatus may include at least one processor, and a memory coupled to the processor. The processor may be configured to perform operations described herein with respect to the wireless device.

In some other implementations, the apparatus may include a non-transitory computer-readable medium having program code recorded thereon and the program code may be executable by a computer for causing the computer to perform operations described herein with reference to the wireless device. In some implementations, the apparatus may include one or more means configured to perform operations described herein. In some implementations, a method of wireless communication may include one or more operations described herein with reference to the apparatus.

In a first aspect, the apparatus is further configured to detect the overheating condition.

In a second aspect, in combination with the first aspect, the apparatus is further configured to generate the overheat assistance indicator based on the detected overheating condition.

In a third aspect, alone or in combination with one or more of the first through second aspects, the apparatus is further configured to determine that the overheating condition is resolved.

In a fourth aspect, in combination with the third aspect, the apparatus is further configured to transmit another overheat assistance indicator to modify the adjusted NR configuration to activate or configure one or more NR capabilities.

In a fifth aspect, alone or in combination with one or more of the first through fourth aspects, the overheat assistance indicator is included in overheating assistance signaling transmitted from the apparatus to a network.

In a sixth aspect, alone or in combination with one or more of the first through fifth aspects, the overheat assistance indicator is included in an information element.

In a seventh aspect, in combination with the sixth aspect, the information element includes a reduced CCs DL information element or a reduced CCs UL information element.

In an eighth aspect, alone or in combination with one or more of the first through seventh aspects, the overheat assistance indicator has a first value that indicates a sum of a desired number of a combination of LTE SCells, NR PSCell, and NR SCells for downlink, and a second value that indicates a sum of a desired number of a combination of LTE SCells, NR PSCell, and NR SCells for uplink.

In a ninth aspect, in combination with the eighth aspect, the apparatus is further configured to deactivate or deconfigure NR SCells prior to LTE secondary cells and the NR PSCell.

In a tenth aspect, in combination with the ninth aspect, the apparatus is further configured to deactivate or deconfigure the NR PSCell prior to the LTE secondary cells.

In an eleventh aspect, in combination with one or more of the eighth through tenth aspects, the apparatus is further configured to, after deactivating or deconfiguring all NR SCCs, determine the overheating condition is present.

In a twelfth aspect, in combination with the eleventh aspect, the apparatus is further configured to request removal of a SCG.

In a thirteenth aspect, alone or in combination with one or more of the first through seventh aspects, the overheat assistance indicator has a value that indicates that the overheat assistance indicator corresponds to the NR configuration.

In a fourteenth aspect, alone or in combination with one or more of the first through seventh aspects, the overheat assistance indicator having a first value indicates to deconfigure all NR secondary SCCs for DL or UL.

In a fifteenth aspect, in combination with the fourteenth aspect, the overheat assistance indicator having a second value indicates to keep one NR SCC and to deconfigure all other NR SCCs for DL or UL.

In a sixteenth aspect, in combination with the fifteenth aspect, the overheat assistance indicator having a second value indicates to keep more than one NR SCC and to deconfigure all other NR SCCs for DL or UL.

In a seventeenth aspect, alone or in combination with one or more of the first through sixteenth aspects, the apparatus is further configured to select a value of the overheat assistance indicator from a plurality of values.

In an eighteenth aspect, in combination with the seventeenth aspect, a first subset of the plurality of values corresponds to a first configuration.

In a nineteenth aspect, in combination with the eighteenth aspect, a second subset of the plurality of values corresponds to a second configuration, the second subset distinct from the first subset.

In a twentieth aspect, in combination with the nineteenth aspect, the first subset includes a first set of sequential values.

In a twenty-first aspect, in combination with the twentieth aspect, the second subset includes a second set of sequential values.

In a twenty-second aspect, in combination with the twenty-first aspect, the second configuration is the NR configuration.

In a twenty-third aspect, in combination with the twenty-second aspect, the first configuration is a LTE configuration.

In a twenty-fourth aspect, in combination with the twenty-second aspect, each value of the second set of sequential values is less than each value of the first set of sequential values.

In a twenty-fifth aspect, alone or in combination with one or more of the first through twenty-fourth aspects, the apparatus is further configured to receive, responsive to the overheat assistance indicator, an adjustment indicator.

In a twenty-sixth aspect, in combination with the twenty-fifth aspect, the adjustment is performed responsive to receiving the adjustment indicator.

In a twenty-seventh aspect, alone or in combination with one or more of the first through twenty-sixth aspects, performing the adjustment includes deconfiguring or deactivating one or more SCCs.

In a twenty-eighth aspect, in combination with the twenty-seventh aspect, the one or more SCCs are included in a first frequency range or a second frequency range. A determination to deconfigure or deactivate a particular SCC of the one or more SCCs is based on which frequency range the SCC is in, a bandwidth, a capability, one or more MIMO layers, another parameters, or a combination thereof.

In a twenty-ninth aspect, in combination with the twenty-seventh aspect, the apparatus is further configured to receive an RRC configuration.

In a thirtieth aspect, in combination with the twenty-ninth aspect, the apparatus is configured to perform the adjustment based on the RRC (re)configuration message.

In a thirty-first aspect, in combination with the twenty-seventh aspect, the apparatus is further configured to receive a MAC-CE.

In a thirty-second aspect, in combination with the thirty-first aspect, the adjustment is performed based on the MAC-CE.

In a thirty-third aspect, alone or in combination with one or more of the first through thirty-second aspects, the apparatus is further configured to detect the overheating condition.

In a thirty-fourth aspect, in combination with the thirty-third aspect, the apparatus is further configured to determine a desired NR configuration based on the detected overheating condition.

In a thirty-fifth aspect, in combination with the thirty-fourth aspect, the apparatus is further configured to generate a reduced UE configuration set indicator based on the desired NR configuration.

In a thirty-sixth aspect, in combination with the thirty-fifth aspect, the apparatus is further configured to transmit the reduced UE configuration set indicator.

In a thirty-seventh aspect, in combination with the thirty-sixth aspect, the reduced UE configuration set indicator is included in a reduced UE category information element.

In a thirty-eighth aspect, in combination with the thirty-sixth aspect, the desired NR configuration includes an aggregated bandwidth, a modulation scheme, one or more MIMO layers, or a combination thereof.

In a thirty-ninth aspect, in combination with the thirty-sixth aspect, to generate the reduced UE configuration set indicator, the apparatus is further configured to map the desired NR configuration to a value of the reduced UE configuration set indicator based on a mapping table.

In a fortieth aspect, in combination with the thirty-ninth aspect, the mapping table includes a reduced UE configuration set mapping table for NR UL or a reduced UE configuration set mapping table for NR DL.

In a forty-first aspect, in combination with the fortieth aspect, the reduced UE configuration set mapping table for NR UL includes a first mapping table for a first frequency range and a second mapping table for a second frequency range.

In a forty-second aspect, in combination with the fortieth aspect, the reduced UE configuration set mapping table for NR DL includes a first mapping table for a first frequency range and a second mapping table for a second frequency range, and the reduced UE configuration set mapping table for NR UL includes a first mapping table for a first frequency range and a second mapping table for a second frequency range.

In a forty-third aspect, in combination with the fortieth aspect, the overheat assistance indicator is set to a particular value to indicate that the reduced UE configuration set indicator corresponds to NR.

In a forty-fourth aspect, alone or in combination with the thirty-sixth aspect, the apparatus is further configured to identify a PLMN vendor.

In a forty-fifth aspect, in combination with the forty-fourth aspect, where a value of the overheat assistance indicator or a value of the reduced UE configuration set indicator is determined based on the identified PLMN vendor.

In a forty-sixth aspect, the apparatus is further configured to set up a timer period using a configurable timer after transmitting the overheat assistance indicator.

In a forty-seventh aspect, in combination with the forty-sixth aspect, the apparatus is further configured to determine whether an adjustment indicator is received during a time period after transmitting the overheat assistance indicator.

In a forty-eighth aspect, in combination with the forty-seventh aspect, after expiration of the time period, the adjustment is performed by the apparatus based on a determination that the adjustment indicator was not received during the time period.

In a forty-ninth aspect, in combination with the forty-eighth aspect, to performing the adjustment, the apparatus is further configured to remove an SCC, deactivating an SCC, or removing an SCG.

In a fiftieth aspect, in combination with the forty-eighth aspect, the apparatus is further configured to receive a value of a duration of the time period from a network.

In some aspects, an apparatus configured for wireless communication, such as a UE, is configured to generate an assistance indicator corresponding to an overheating condition at the apparatus, the assistance indicator indicating an adjustment order preference. The apparatus is also configured to transmit the assistance indicator. In some implementations, the apparatus includes a wireless device, such as a UE. In some implementations, the apparatus may include at least one processor, and a memory coupled to the processor. The processor may be configured to perform operations described herein with respect to the wireless device. In some other implementations, the apparatus may include a non-transitory computer-readable medium having program code recorded thereon and the program code may be executable by a computer for causing the computer to perform operations described herein with reference to the wireless device. In some implementations, the apparatus may include one or more means configured to perform operations described herein. In some implementations, a method of wireless communication may include one or more operations described herein with reference to the apparatus.

In a fifty-first aspect, the assistance indicator is generated while the apparatus is in an LTE SA configuration, an NR SA, or a dual connectivity mode.

In a fifty-second aspect, while the apparatus is in a dual connectivity configuration, the assistance indicator indicates the adjustment order preference of an NR configuration.

In a fifty-third aspect, alone or in combination with one or more of the fifty-first through fifty-second aspects, the apparatus is further configured to detect the overheating condition.

In a fifty-fourth aspect, alone or in combination with one or more of the fifty-first through fifty-third aspects, the apparatus is further configured to receive, responsive to the assistance indicator, an adjustment indicator.

In a fifty-fifth aspect, in combination with the fifty-fourth aspect, the apparatus is further configured to perform an adjustment on an NR configuration.

In a fifty-sixth aspect, alone or in combination with one or more of the fifty-first through fifty-fifth aspects, the assistance indicator includes one or more values to indicate the adjustment order preference, each value of the one or more values corresponding to a different adjustment option of one or more adjustment options.

In a fifty-seventh aspect, alone or in combination with one or more of the fifty-first through fifty-sixth aspects, the assistance indicator includes a plurality of values arranged according to a sequence of a plurality of adjustment options.

In a fifty-eighth aspect, in combination with the fifty-seventh aspect, the plurality of values include a plurality of weight values.

In a fifty-ninth aspect, in combination with one or more of the fifty-seventh through fifty-eighth aspects, two or more adjustment options of the plurality of adjustment options have the same value.

In a sixtieth aspect, in combination with one or more of the fifty-seventh through fifty-ninth aspects, the plurality of adjustment options include a number of component carriers, a bandwidth of a first frequency range, a number of MIMO layers for the first frequency range, a bandwidth of a second frequency range, a number of MIMO layers for the second frequency range, or a combination thereof.

In a sixty-first aspect, in combination with one or more of the fifty-seventh through sixtieth aspects, for each adjustment option of the plurality of adjustment options, the plurality of values includes a UL value, a DL value, or both.

In a sixty-second aspect, alone or in combination with one or more of the fifty-first through sixty-first aspects, the assistance indicator is included in an information element.

In a sixty-third aspect, in combination with the sixty-second aspect, the information element is included in UEAssistanceInformation-v1540 information elements.

In a sixty-fourth aspect, alone or in combination with one or more of the fifty-first through sixty-third aspects, the apparatus is further configured to identify a PLMN vendor.

In a sixty-fifth aspect, in combination with the sixty-fourth aspect, where one or more values of the assistance indicator, one or more adjustment options corresponding to the assistance indicator, or both, are determined based on the identified PLMN vendor.

In a sixty-sixth aspect, in combination with the fifty-fourth aspect, the apparatus is further configured to, after transmission of the assistance indicator, determine whether an adjustment indicator is received during a time period.

In a sixty-seventh aspect, in combination with the sixty-sixth aspect, after expiration of the time period, an adjustment is performed by the apparatus on the NR configuration based on a determination that the adjustment indicator was not received during the time period.

In a sixty-eighth aspect, in combination with the sixty-seventh aspect, to perform the adjustment, the apparatus is further configured to remove an SCC.

In a sixty-ninth aspect, in combination with the sixty-seventh aspect, the apparatus is further configured to receive a value of a duration of the time period from a network.

In a seventieth aspect, the apparatus is further configured to generate, while in a dual connectivity configuration, an overheat assistance indicator based on the overheating condition.

In a seventy-first aspect, in combination with the seventieth aspect, the apparatus is further configured to transmit an overheat assistance indicator.

In a seventy-second aspect, the apparatus is further configured to transmit multiple assistance indicators, each of the multiple assistance indicators corresponding to a different adjustment option.

In a seventy-third aspect, in combination with the seventy-second aspect, a transmission order of the assistance indicators corresponds to the adjustment order preference.

In some aspects, an apparatus configured for wireless communication, such as a UE, is configured to generate, while in an MCG RN configuration, an assistance indicator corresponding to an overheating condition at the apparatus. The apparatus is also configured to transmit the assistance indicator. In some implementations, the apparatus includes a wireless device, such as a UE. In some implementations, the apparatus may include at least one processor, and a memory coupled to the processor. The processor may be configured to perform operations described herein with respect to the wireless device. In some other implementations, the apparatus may include a non-transitory computer-readable medium having program code recorded thereon and the program code may be executable by a computer for causing the computer to perform operations described herein with reference to the wireless device. In some implementations, the apparatus may include one or more means configured to perform operations described herein. In some implementations, a method of wireless communication may include one or more operations described herein with reference to the apparatus.

In a seventy-fourth aspect, the MCG RN includes an NN-DC configuration or an NE-DC configuration.

In a seventy-fifth aspect, alone or in combination with the seventy-fourth aspect, the assistance indicator is included in an information element.

In a seventy-sixth aspect, in combination with the seventy-fifth aspect, the information element is included in at least one UEAssistanceInformation-v1540 information elements.

In a seventy-seventh aspect, alone or in combination with one or more of the seventy-fourth through seventy-sixth aspects, the apparatus is further configured to generate an SCG indicator corresponding to the assistance indicator.

In a seventy-eighth aspect, in combination with the seventy-seventh aspect, the apparatus is further configured to transmit the SCG indicator.

In a seventy-ninth aspect, in combination with the seventy-eighth aspects the apparatus is further configured to, after transmission of the assistance indicator, receive an adjustment indicator from a MN responsive to the assistance indicator.

In an eightieth aspect, in combination with the seventy-ninth aspect, the apparatus is further configured to perform an adjustment on an NR configuration.

In an eighty-first aspect, in combination with the seventy-eighth aspect, the apparatus is further configured to, after transmission of the assistance indicator, receive an adjustment indicator from an SN responsive to the assistance indicator.

In an eighty-second aspect, in combination with the eighty-first aspect, the apparatus is further configured to perform an adjustment on an NR configuration.

In an eighty-third aspect, in combination with the eighty-second aspect, the SN is configured for inter-node messaging with an MN for coordination corresponding to the adjustment indicator.

In an eighty-fourth aspect, in combination with the seventy-eighth aspect, the apparatus is further configured to transmit one or more information elements. For example, the one or more information elements may include one or more UEAssistanceInformation-v1540 information elements.

In an eighty-fifth aspect, in combination with the eighty-fourth aspect, at least one information element of the one or more information elements includes the assistance indicator.

In an eighty-sixth aspect, in combination with the eighty-fifth aspect, at least one information element of the one or more information elements includes a flag configure to indicate whether the corresponding at least one information element corresponds to the MCG, the SCG, or both.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., functional blocks of FIGS. 5-10 and modules in FIG. 2) may include processors, electronics devices, hardware devices, electronics components, logical circuits, memories, software codes, firmware codes, etc., or any combination thereof. In addition, features discussed herein relating to the functional blocks and modules described herein (e.g., functional blocks of FIGS. 5-10 and modules in FIG. 2) may be implemented via specialized processor circuitry, via executable instructions, and/or combinations thereof.

Those of skill would further appreciate that the various illustrative logical blocks, modules, circuits, and algorithm steps (e.g., the logical blocks in FIGS. 5-10) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can include RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of" A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
    transmitting, by a user equipment (UE) while in a dual connectivity configuration, an overheat assistance indicator corresponding to an overheating condition at the UE, the overheat assistance indicator includes:
        a first value that indicates a first sum of a first desired number of a first combination of long term evolution (LTE) secondary cells (SCells), new radio (NR) primary secondary cell (PSCell), and NR SCells for downlink,
        a second value that indicates a second sum of a second desired number of a second combination of LTE SCells, NR PSCell, and NR SCells for uplink, or
        a combination thereof; and
    after sending the overheat assistance indicator and based on the overheating condition, performing, by the UE, an adjustment on an NR configuration.

2. The method of claim 1, further comprising:
    detecting, by the UE, the overheating condition; and
    generating, by the UE, the overheat assistance indicator based on the detected overheating condition;
    determining, by the UE, that the overheating condition is resolved; and
    transmitting, by the UE, another overheat assistance indicator to modify the adjusted NR configuration to activate or configure one or more NR capabilities.

3. The method of claim 1, wherein the overheat assistance indicator is included in overheating assistance signaling transmitted from the UE to a network, and wherein the overheat assistance indicator is included in an information element, the overheat assistance indicator has a value that indicates that the overheat assistance indicator corresponds to the NR configuration, or a combination thereof.

4. The method of claim 1, wherein the overheat assistance indicator has the first value and the second value.

5. The method of claim 1, further comprising:
    deactivating or deconfiguring NR SCells prior to LTE secondary cells and the NR PSCell; and
    deactivating or deconfiguring the NR PSCell prior to the LTE secondary cells.

6. The method of claim 1, further comprising, after deactivating or deconfiguring all NR SCCs:
    determining the overheating condition is present; and
    requesting removal of a secondary cell group (SCG).

7. The method of claim 1, wherein:
    the overheat assistance indicator having a third value indicates to deconfigure all NR secondary component carriers (SCCs) for downlink (DL) or uplink (UL);
    the overheat assistance indicator having a fourth value indicates to keep one NR SCC and to deconfigure all other NR SCCs for DL or UL; and
    the overheat assistance indicator having a fifth value indicates to keep more than one NR SCC and to deconfigure all other NR SCCs for DL or UL.

8. An apparatus configured for wireless communication, comprising:
    means for transmitting, by a user equipment (UE) while in a dual connectivity configuration, an overheat assistance indicator corresponding to an overheating condition at the UE, the overheat assistance indicator includes:
        a first value that indicates a first sum of a first desired number of a first combination of long term evolution (LTE) secondary cells (SCells), new radio (NR) primary secondary cell (PSCell), and NR SCells for downlink,
        a second value that indicates a second sum of a second desired number of a second combination of LTE SCells, NR PSCell, and NR SCells for uplink, or
        a combination thereof; and
    means for performing, by the UE, an adjustment on a new radio (NR) configuration after sending the overheat assistance indicator and based on the overheating condition.

9. The apparatus of claim 8, further comprising means for selecting a value of the overheat assistance indicator from a plurality of values, wherein a first subset of the plurality of values corresponds to a first configuration, and wherein a second subset of the plurality of values corresponds to a second configuration, the second subset distinct from the first sub set.

10. The apparatus of claim 8, further comprising means for receiving, responsive to the overheat assistance indicator, an adjustment indicator, and wherein the adjustment is performed responsive to receiving the adjustment indicator.

11. The apparatus of claim 8, wherein the means for performing the adjustment comprises means for deconfiguring or deactivating one or more secondary component carriers (SCCs), wherein the one or more SCCs are included in a first frequency range or a second frequency range, and wherein a determination to deconfigure or deactivate a particular SCC of the one or more SCCs is based on which frequency range the particular SCC is in, a bandwidth, a capability, one or more multiple input multiple output (MIMO) layers, another parameters, or a combination thereof.

12. The apparatus of claim 8, further comprising:
means for detecting the overheating condition;
means for determining a desired NR configuration based on the detected overheating condition, wherein the desired NR configuration includes an aggregated bandwidth, a modulation scheme, one or more multiple input multiple output (MIMO) layers, or a combination thereof;
means for generating a reduced UE configuration set indicator based on the desired NR configuration, wherein generating the reduced UE configuration set indicator comprises mapping, by the UE, the desired NR configuration to a value of the reduced UE configuration set indicator based on a mapping table; and
means for transmitting the reduced UE configuration set indicator.

13. The apparatus of claim 12, wherein the mapping table comprises a reduced UE configuration set mapping table for NR uplink (UL) or a reduced UE configuration set mapping table for NR downlink (DL).

14. The apparatus of claim 12, further comprising means for identifying a public land mobile network (PLMN) vendor, where at least one value of the overheat assistance indicator or at least one value of the reduced UE configuration set indicator is determined based on the identified PLMN vendor.

15. The apparatus of claim 8, further comprising:
means for setting up a timer period using a configurable timer after transmitting the overheat assistance indicator;
means for determining whether an adjustment indicator is received during a time period after transmitting the overheat assistance indicator; and
wherein, after expiration of the time period, the adjustment is performed based on a determination that the adjustment indicator was not received during the time period.

16. An apparatus configured for wireless communication, the apparatus comprising:
at least one processor; and
a memory storing instructions and coupled to the at least one processor,
wherein the at least one processor is configured to execute the instructions to:
initiate transmit transmission, while a user equipment (UE) is in a dual connectivity configuration, an overheat assistance indicator corresponding to an overheating condition at the UE, the overheat assistance indicator includes:
a first value that indicates a first sum of a first desired number of a first combination of long term evolution (LTE) secondary cells (SCells), new radio (NR) primary secondary cell (PSCell), and NR SCells for downlink,
a second value that indicates a second sum of a second desired number of a second combination of LTE SCells, NR PSCell, and NR SCells for uplink, or
a combination thereof; and
perform an adjustment on a new radio (NR) configuration after sending the overheat assistance indicator and based on the overheating condition.

17. The apparatus of claim 16, wherein the at least one processor is further configured to execute the instructions to:
generate an assistance indicator corresponding to the overheating condition at the UE, the assistance indicator indicating an adjustment order preference; and
initiate transmission of the assistance indicator.

18. The apparatus of claim 17, wherein, while the UE is in the dual connectivity configuration, the assistance indicator indicates the adjustment order preference of an NR configuration.

19. The apparatus of claim 17, wherein the at least one processor is further configured to execute the instructions to:
receive, responsive to the assistance indicator, an adjustment indicator;
after transmission of the assistance indicator, determine whether the adjustment indicator is received during a time period; and
perform an adjustment on an NR configuration.

20. The apparatus of claim 17, wherein the assistance indicator includes one or more values to indicate the adjustment order preference, each value of the one or more values corresponding to a different adjustment option of one or more adjustment options.

21. The apparatus of claim 17, wherein the assistance indicator includes a plurality of values arranged according to a sequence of a plurality of adjustment options, and wherein the plurality of adjustment options include a number of component carriers, a first bandwidth of a first frequency range, a first number of multiple input multiple output (MIMO) layers for the first frequency range, a second bandwidth of a second frequency range, a second number of MIMO layers for the second frequency range, or a combination thereof.

22. The apparatus of claim 17, wherein the assistance indicator includes a plurality of values arranged according to a sequence of a plurality of adjustment options, and wherein, for each adjustment option of the plurality of adjustment options, the plurality of values includes an uplink (UL) value, a downlink (DL) value, or both.

23. The apparatus of claim 17, wherein the at least one processor is further configured to execute the instructions to identify a public land mobile network (PLMN) vendor, where one or more values of the assistance indicator, one or more adjustment options corresponding to the assistance indicator, or both, are determined based on the identified PLMN vendor.

24. The apparatus of claim 17, wherein the at least one processor is further configured to execute the instructions to initiate transmission of multiple assistance indicators, each of the multiple assistance indicators corresponding to a different adjustment option, where a transmission order of the assistance indicators corresponds to the adjustment order preference.

25. A non-transitory computer-readable medium having program code recorded thereon, the program code executable by a computer for causing the computer to:
- transmit, while a user equipment (UE) is in a dual connectivity configuration, an overheat assistance indicator corresponding to an overheating condition at the UE, the overheat assistance indicator includes:
  - a first value that indicates a first sum of a first desired number of a first combination of long term evolution (LTE) secondary cells (SCells), new radio (NR) primary secondary cell (PSCell), and NR SCells for downlink,
  - a second value that indicates a second sum of a second desired number of a second combination of LTE SCells, NR PSCell, and NR SCells for uplink, or
  - a combination thereof; and
- perform an adjustment on a new radio (NR) configuration after sending the overheat assistance indicator and based on the overheating condition.

26. The non-transitory computer-readable medium of claim 25, wherein the program code is further executable by the computer for causing the computer to:
- generate, while the UE is in a master cell group (MCG) radio network (RN) configuration, an assistance indicator corresponding to the overheating condition at the UE; and
- transmit the assistance indicator.

27. The non-transitory computer-readable medium of claim 26, wherein the MCG RN comprises a New Radio New Radio Dual Connectivity (NN-DC) configuration, a New Radio E-UTRA Dual Connectivity (NE-DC) configuration, or an Evolved Universal Terrestrial Radio Access New Radio Dual Connectivity Dual Connectivity (EN-DC) configuration.

28. The non-transitory computer-readable medium of claim 26, wherein the program code is further executable by the computer for causing the computer to:
- generate a secondary cell group (SCG) indicator corresponding to the assistance indicator;
- transmit the SCG indicator;
- after transmission of the assistance indicator, receive an adjustment indicator from a master node (MN) or a secondary node (SN) responsive to the assistance indicator; and
- perform an adjustment on a NR configuration.

29. The non-transitory computer-readable medium of claim 28, wherein the SN is configured for inter-node messaging with the MN for coordination corresponding to the adjustment indicator.

30. The non-transitory computer-readable medium of claim 26, wherein the program code is further executable by the computer for causing the computer to:
- generate a secondary cell group (SCG) indicator corresponding to the assistance indicator;
- transmit the SCG indicator; and
- transmit one or more information elements; and
- wherein at least one information element of the one or more information elements includes the assistance indicator and a flag configured to indicate whether the at least one information element corresponds to the MCG, the SCG, or both.

* * * * *